United States Patent

Apps et al.

[11] Patent Number: 5,575,390
[45] Date of Patent: Nov. 19, 1996

[54] NESTABLE AND STACKABLE TRAY FOR CANS OR THE LIKE

[75] Inventors: William P. Apps, Anaheim; Arne Lang-Ree, Manhattan Beach, both of Calif.

[73] Assignee: Rehrig Pacific Company, Los Angeles, Calif.

[21] Appl. No.: 944,742

[22] Filed: Oct. 21, 1992

Related U.S. Application Data

[63] Continuation of Ser. No. 528,215, May 25, 1990, abandoned, which is a continuation-in-part of Ser. No. 272,039, Nov. 15, 1988, Pat. No. 4,932,532, and Ser. No. 369,598, Jun. 21, 1989, abandoned, and Ser. No. 357,068, May 23, 1989, Pat. No. Des. 317,670.

[51] Int. Cl.⁶ ............................................. B65D 1/24
[52] U.S. Cl. .......................................... 206/503; 220/519
[58] Field of Search ........................... 220/519; 206/427, 206/499, 503, 518, 519, 821, 503

[56] References Cited

U.S. PATENT DOCUMENTS

| | | | |
|---|---|---|---|
| D. 244,486 | 5/1977 | Johnson et al. | D87/1R |
| D. 247,652 | 3/1978 | Carroll et al. | D87/1 R |
| D. 284,841 | 7/1986 | Rowland et al. | D9/456 |
| D. 291,178 | 8/1987 | Toms | D9/345 |
| 2,535,493 | 12/1950 | Gerber . | |
| 2,777,597 | 1/1957 | Ruff | 220/97 |
| 3,009,579 | 11/1961 | Ettlinger, Jr. | 211/71 |
| 3,055,542 | 9/1962 | Russo | 220/104 |
| 3,055,543 | 9/1962 | Russo | 206/515 |
| 3,104,044 | 9/1963 | Reifers | 229/2.5 |
| 3,115,268 | 11/1964 | Fogerty | 220/21 |
| 3,203,583 | 8/1965 | Amberg et al. | 220/102 |
| 3,219,233 | 11/1965 | Whiteford | 220/102 |
| 3,332,574 | 7/1967 | Earp | 206/519 |
| 3,333,727 | 8/1967 | Belcher et al. | 220/97 |
| 3,347,405 | 10/1967 | Motsenbocker | 220/21 |
| 3,349,943 | 10/1967 | Box | 220/21 |
| 3,391,814 | 7/1968 | Box | 220/21 |
| 3,391,815 | 7/1968 | Box | 220/21 |
| 3,420,402 | 1/1969 | Frater et al. | 220/97 |
| 3,428,207 | 2/1969 | Schoeller | 220/21 |

(List continued on next page.)

FOREIGN PATENT DOCUMENTS

| | | |
|---|---|---|
| 1351218 | 6/1964 | France . |
| 2135278 | 8/1984 | France . |
| 2345353 | 10/1987 | France . |
| 2801077 | 7/1978 | Germany . |
| 1115343 | 5/1968 | United Kingdom . |
| 1152038 | 5/1969 | United Kingdom . |
| 1182452 | 2/1970 | United Kingdom . |
| 2220196 | 6/1989 | United Kingdom . |
| WO82/01536 | 5/1982 | WIPO . |

*Primary Examiner*—Steven M. Pollard
*Attorney, Agent, or Firm*—Banner & Allegretti, Ltd.

[57] ABSTRACT

Reusable plastic trays for storing and transporting beverage containers, such as twelve-ounce metal cans and two-liter PET bottles. The tray floor has thereon an array of support areas for the containers. The tray rail band thereof is spaced high enough above the floor to prevent container tipping and in a "low-depth" configuration. The outside rail band faces are vertical on both sides and are against the containers, and thereby add little to the outside tray dimensions. The inside face contacts and supports the peripheral containers. Columns between adjacent support areas interconnect the rail and the floor, angle downwardly and inwardly therebetween, open outwardly and form vertical nesting slots. The trays when empty can thereby be stacked in a deeply nesting position whereby each additional tray adds only the height of its narrow rail to the nested tray stack height. When the tray is a can tray, the bottom surface of the floor has a pattern of protuberances and recessed areas therebetween. When a loaded can tray is supported and located on a similar tray therebeneath, the lower can rims fit into the recessed areas and the protuberances are positioned both inside of and outside of the rims thereby locating and locking the upper tray in place. To unlock the upper tray it is simply twisted so that the protuberances ride up their bevelled edges onto the rims and into a sliding position.

8 Claims, 26 Drawing Sheets

U.S. PATENT DOCUMENTS

| | | | |
|---|---|---|---|
| 3,517,852 | 6/1970 | Schoeller | 220/21 |
| 3,756,429 | 9/1973 | Fleischer et al. | |
| 3,759,416 | 9/1973 | Constantine | 206/505 |
| 3,791,549 | 2/1974 | Delbrouck et al. | 206/203 |
| 3,794,208 | 2/1974 | Roush et al. | 206/507 |
| 3,949,876 | 4/1976 | Bridges et al. | 206/427 |
| 4,011,948 | 3/1977 | Rehrig et al. | 206/515 |
| 4,095,720 | 6/1978 | Delbrouck et al. | 220/21 |
| 4,098,403 | 7/1978 | Davis | 206/519 |
| 4,161,259 | 7/1979 | Palafox | 220/21 |
| 4,195,746 | 4/1980 | Cottrell | 220/4 |
| 4,197,958 | 4/1980 | Zeni et al. | 206/503 |
| 4,205,749 | 6/1980 | Carroll et al. | 206/507 |
| 4,249,671 | 2/1981 | Crolli . | |
| 4,256,224 | 3/1981 | Hirota | 206/203 |
| 4,304,334 | 12/1981 | Hirota | 206/507 |
| 4,316,540 | 2/1982 | Lapham | 206/507 |
| 4,319,685 | 3/1982 | David | 206/508 |
| 4,342,403 | 8/1982 | Badtke et al. | 220/345 |
| 4,344,530 | 8/1982 | deLarosiere | 206/203 |
| 4,373,627 | 2/1983 | Wood | 206/201 |
| 4,410,099 | 10/1983 | deLarosiere | 220/21 |
| 4,416,374 | 11/1983 | Smith et al. | 206/507 |
| 4,423,813 | 1/1984 | Kreeger et al. | 206/507 |
| 4,538,742 | 9/1985 | Prodel | 220/21 |
| 4,548,320 | 10/1985 | Box . | |
| 4,615,444 | 10/1986 | deLarosiere | 206/427 |
| 4,700,837 | 10/1987 | Hammett | 206/427 |
| 4,789,063 | 12/1988 | Hammett | 206/432 |
| 4,823,955 | 4/1989 | Apps | 206/506 |
| 4,834,243 | 5/1989 | Langenbeck | 206/557 |
| 4,838,419 | 6/1989 | Weits et al. | 206/507 |
| 4,872,560 | 10/1989 | Langenbeck | 206/557 |
| 4,896,774 | 1/1990 | Hammett et al. | 206/516 |
| 4,899,874 | 2/1990 | Apps et al. | 220/102 |
| 4,932,532 | 6/1990 | Apps et al. | 206/503 |
| 4,944,400 | 7/1990 | Van Onstein et al. . | |
| 5,031,774 | 7/1991 | Morris et al. | 220/519 X |

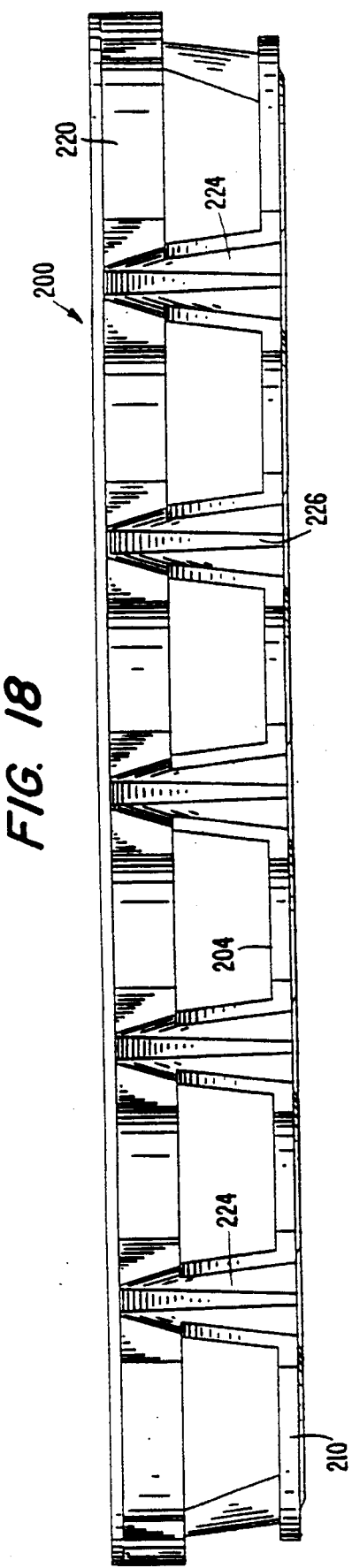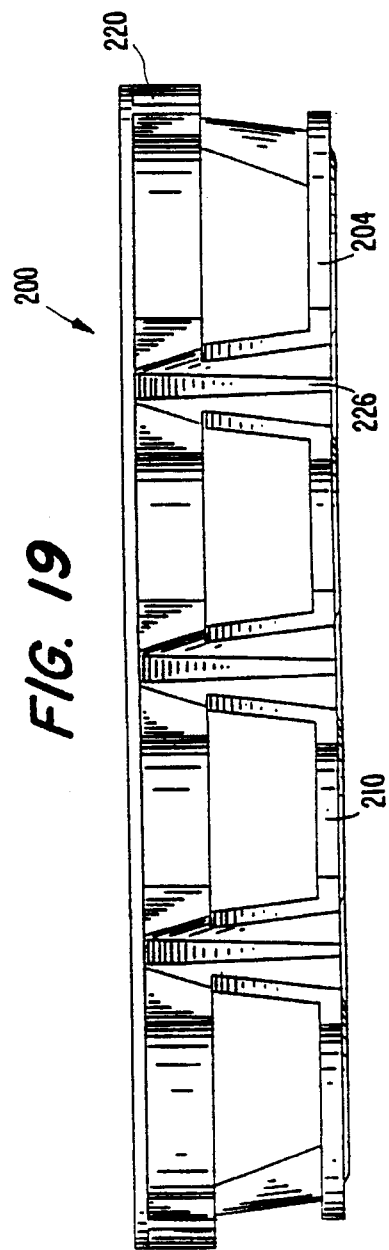

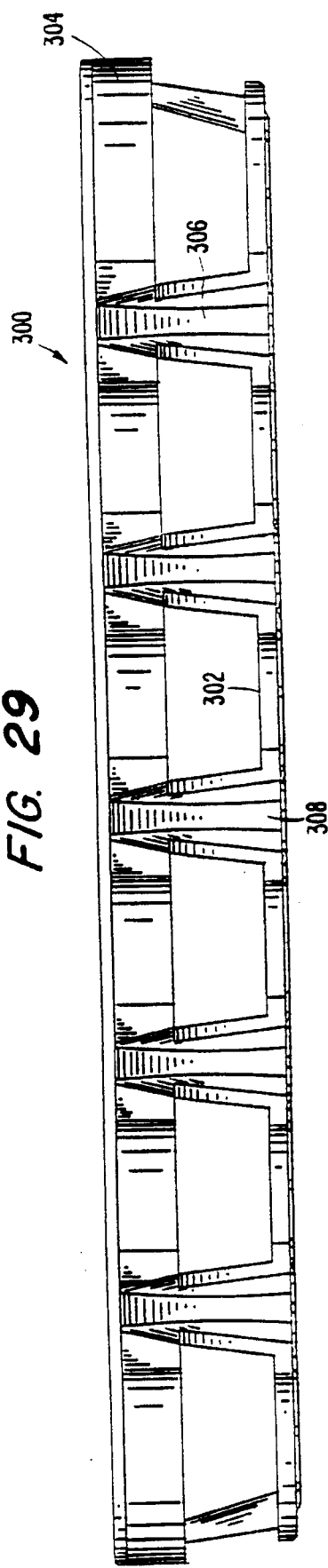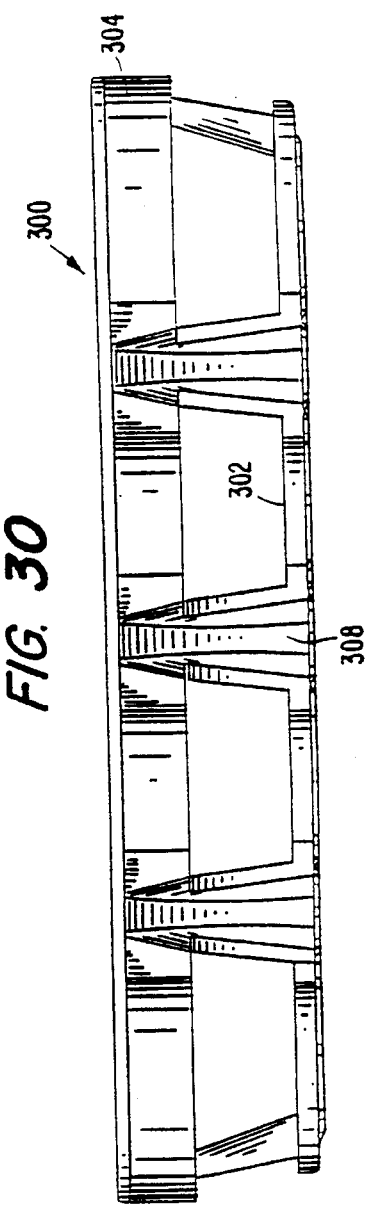

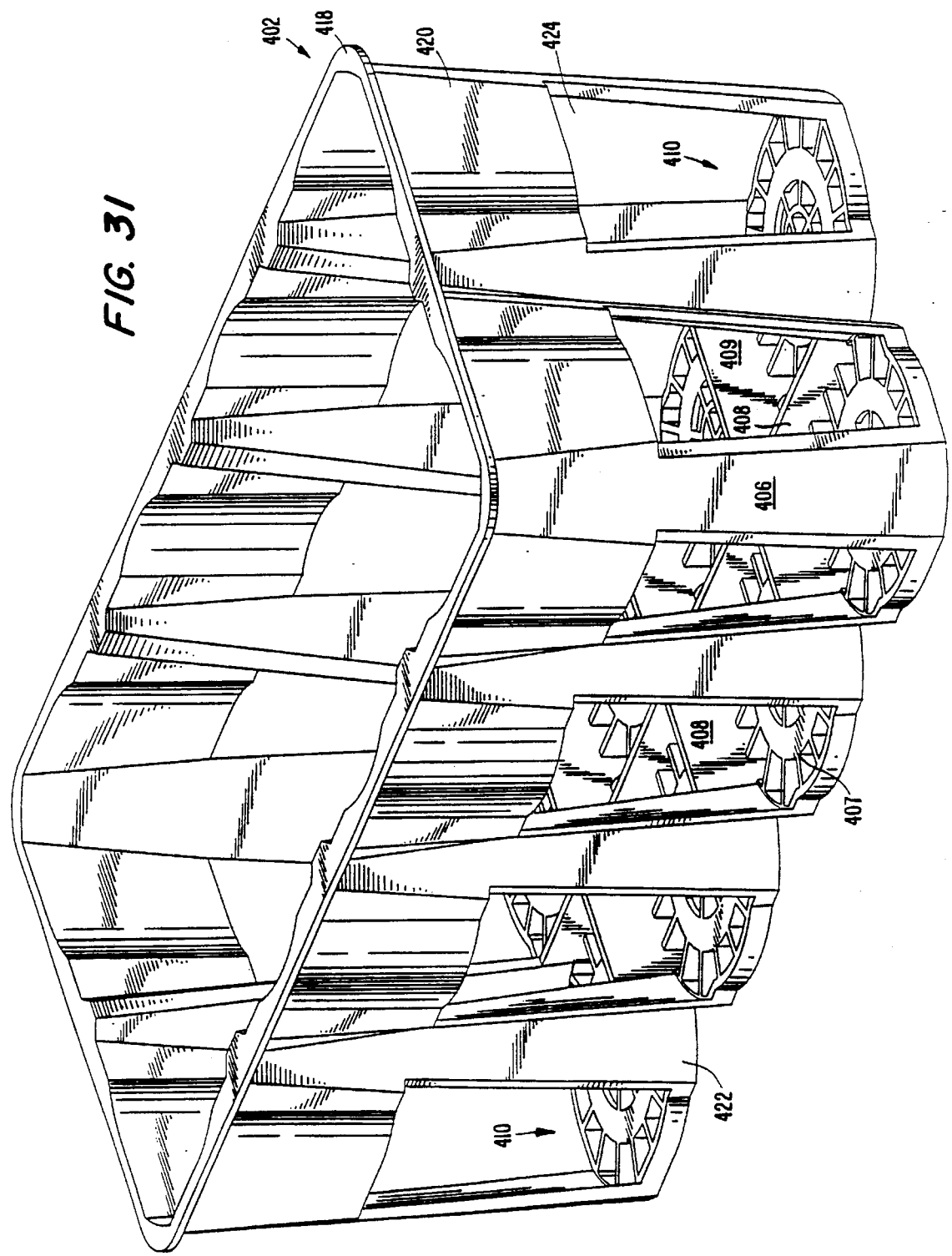

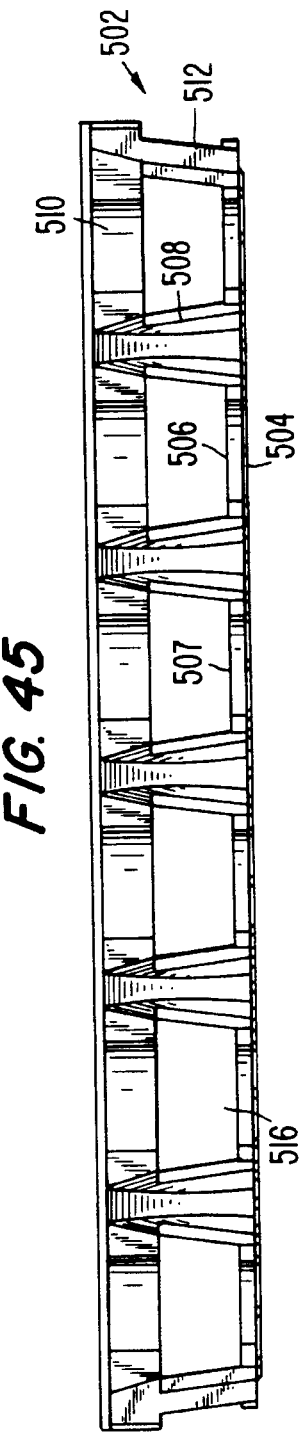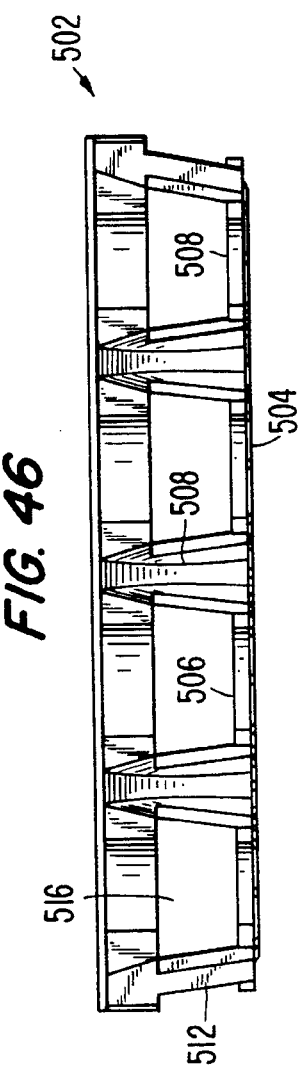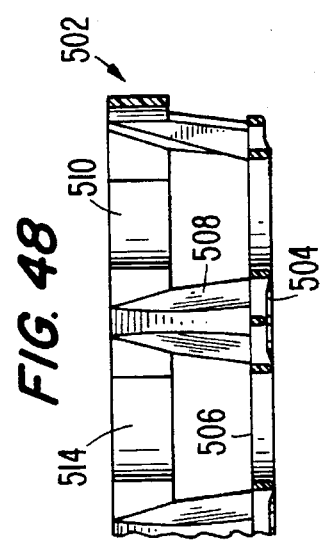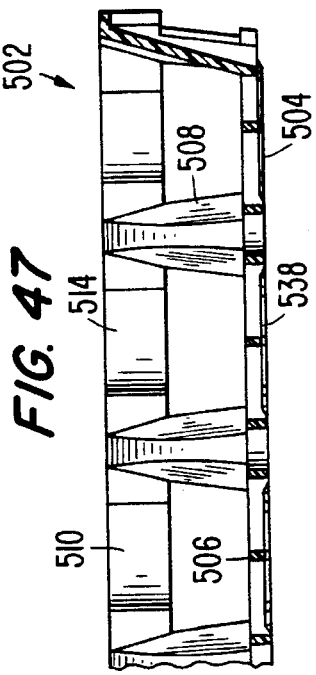

NESTABLE AND STACKABLE TRAY FOR CANS OR THE LIKE

CROSS-REFERENCE TO RELATED APPLICATIONS

This application is a continuation of application Ser. No. 07/528,215, filed May 25, 1990, abandoned.

This is a continuation-in-part of applications (1) Ser. No. 07/272,039 ('039), filed Nov. 15, 1988, U.S. Pat. No. 4,932,532 (2) Ser. No. 07/369,598 ('598), filed Jun. 21, 1989, abandoned and (3) Ser. No. 07/357,068 ('068), filed May 23, 1989 U.S. Pat. No. 317,670. The entire contents of each of these applications are hereby incorporated by reference.

BACKGROUND OF THE INVENTION

The present invention relates to low depth, nestable trays for transporting and storing beverage containers, such as twelve-ounce aluminum cans and two-liter plastic bottles.

Cans for soft drinks, beer and other beverages are often stored and transported during the distribution stages thereof in short-walled cardboard trays or boxes. These cardboard trays are generally not rugged enough for reuse and therefore must be discarded by the retailer at his expense. They are flimsy and can collapse when wet. They also are unattractive and do not permit the full display, merchandising and advertising of the cans. Thus, there has been a need for a returnable and reusable tray for storing and transporting cans and the like. This tray should be light weight, easy to manipulate and carry, and economically constructed, since the non-reusable cardboard trays which it replaces cost generally less than a dime. An example of a relatively recent, returnable and reusable tray of the present assignee and particularly adapted for handling twenty-four twelve ounce, pull-top aluminum cans is that disclosed in the copending '039 and '399 applications.

When empty the reusable plastic trays of the '039 application are nestable one within the other so as to occupy less storage space and to be more easily handled. The trays are unfortunately nestable only to a small extent, perhaps one-quarter of their total height. In other words, each additional tray adds about three-quarters of the total tray height to the stack of empty trays. A large amount of storage space is thus needed for the empty trays, and the stack of trays can be rather tall and cumbersome. The sides of that tray are solid around their perimeter, and thus the lower portions of the cans or other containers held therein, especially when the loaded trays are stacked, are not exposed. This prevents the containers therein from being readily seen to both determine how full the trays are and also the container brand from its label.

Reusable plastic cases have also been developed for transporting and storing bottles such as two-liter beverage bottles. An example of a recent plastic, nesting and stacking storage container is that disclosed in U.S. Pat. No. 4,823,955 of the present assignee. These cases often have a height which is greater than the height of the bottles contained therein such that when stacked the cases do not rest on top of the bottles in the lower case. Rather, the sides of the cases bear the loads of the upper cases and their contents. These cases are expensive to manufacture, to ship and to store empty as they are relatively large and occupy a great deal of space. Since they totally surround the bottles held therein, they prevent them from being fully displayed.

Plastic low depth cases have thus been developed wherein the side walls are lower than the height of the stored bottles. The bottles contained in a lower case thereby support the weight of the other cases stacked on top of them. Today's plastic, polyethylene terephthalate (PET), bottles have become particularly popular because of their transparency, light weight and low cost. Even though they are flexible, their walls are strong in tension and thus can safely contain the pressure of carbonated beverages therein. Their flexible walls can bear surprisingly high compressive loads as well, as long as these loads are applied axially. Thus, it is important that the bottles do not tip in their cases or trays, as the loads thereon when stacked would then not be along the longitudinal axes of the bottles, and the loaded bottles can thereby be caused to buckle. This is particularly true for the larger capacity PET bottles, such as the two-liter bottles widely used for soft drinks today. Thus, some of the prior art cases require additional structure therein to hold the bottles stable. Others have handles which must be removed in order to stack the empty cases, which is an inconvenient and time consuming step. Some of these low depth cases also have higher walls which reduce their display capabilities.

One commercially successful design of the stackable low depth cases particular suitable for the two-liter PET bottles is the "Castle Crate" design of the present assignee, such as is disclosed in U.S. Pat. No. 4,899,874, whose entire contents are hereby incorporated by reference. For this genre of cases a plurality of columns project upwardly from the bottom case portion and together with the side walls help define a plurality of bottle retaining pockets. This case with its internal columns, when empty, resembles a medieval castle. These columns are hollow to permit empty crates to stack top to bottom. These low-profile crate designs have spaced side columns to provide added strength and yet still expose the containers therein. This design though requires a certain registration of the empty crates for nesting purposes making the procedure a slight bit more cumbersome and time consuming than desirable.

Beverages in the twelve or sixteen ounce sizes are often sold, as in convenience stores, loose or individually, that is, not in an attached six-pack arrangement. To remove the bottles or cans from their six-pack (secondary) packaging, whether a shrink wrap, a cardboard enveloping carton, or an interconnected plastic ring arrangement, is a labor intensive procedure.

Some of the known trays do not hold their beverage containers in a continuous spaced relation so that The containers rub against one another or crate structure while in transport. This action can rub off the container labels or scratch the containers, and is a particular problem for metal soft drink and beer cans.

Pull-top aluminum cans for soft drinks and other beverages are usually stored and transported in short-walled cardboard trays or in cardboard boxes. On the other hand, because of the ever increasing cost in disposable tertiary packaging, returnable, reusable containers are becoming popular for the storage and handling of bottles. However, unlike plastic or glass bottles which have rounded edges on their crown or top, pull-top aluminum cans have square sharp corners where the top of the can attaches to the side walls. Therefore, particular difficulties have been encountered in the stacking and manipulating of the trays of cans stacked relative to one another. In fact, aside from the '039 tray there are no prior known returnable, reusable trays suitable for supporting pull-top aluminum cans and which can, when filled with such cans, be stacked securely one on top of another, so that the top tray of a stack of filled trays can be easily pulled off and along the stack without being lifted. In other words, the trays should be constructed so that when loaded they can be easily pivoted and slid off of loaded trays beneath them without having to be lifted.

SUMMARY OF THE INVENTION

Accordingly, it is a principal object of the present invention to provide an improved nestable, low depth tray for storing and transporting containers, such as beverage cans and bottles.

Another object of the present invention is to provide an improved low-depth can tray which, when loaded and stacked on a similar loaded tray beneath, is securely supported but can be easily slid on and along the cans beneath it when desired.

A further object of the present invention is to provide an improved low-depth, nestable container tray design which occupies less space both when in a loaded stacked relation and when in an empty nested relation.

A still further object of the present invention is to provide an improved low-depth, nestable tray design which has an open side configuration thereby allowing the containers loaded therein to be readily and more fully seen, counted, identified and displayed.

Another object of the present invention is to provide improved low-depth, nestable trays which can be readily stacked in a deeply nested relation when empty without requiring any extra or special manipulation of one tray relative to another.

A further object of the present invention is to provide an improved low-depth, nestable tray which can hold loose cans therein in a compact array while preventing them from rubbing against one another during transport.

A still further object of the present invention is to provide a plastic low depth, nestable tray which is light weight, economical to manufacture and attractive.

Another object of the present invention is to provide an improved reusable tray which can transport and store loose containers as well as those connected and held securely in a six-pack arrangement.

Directed to achieving these objects, a novel low-depth, nestable tray for beverage containers is herein provided. This tray is formed by integrally molding from plastic three basic components—a floor, an upper rail and a plurality of generally conical columns. The floor has on its top surface a plurality of fluid container support areas, each for supporting thereon a separate fluid container. The bottom floor surface in turn has a number of receiving areas for receiving thereon the tops of similar fluid containers in a layer in a similar tray beneath the floor. The rail is formed by an upright band having vertical inner and outer surfaces and a lip at the top thereof projecting outwardly a slight distance. The rail is positioned generally parallel to and above the floor so as to be below the tops of the fluid containers when resting on the floor, and thereby in a low-depth arrangement, but high enough relative to them to prevent them from tipping. The columns extend between, interconnect and merge with the floor and the rail. They are spaced around the outside of the floor and between adjacent support areas. Each of them has a generally truncated conical shape and defines a longitudinal slot disposed outwardly relative to the floor and extending generally from the bottom of the floor up to the lip. The slots taper upwardly, are inclined inwardly towards the floor, and are configured to slidingly receive therein the inner surfaces of similar columns in a similar tray therebeneath such that the floor fits within the open rail when the trays are in an empty nested relation. The areas between the adjacent columns and between the rail and floor and along both sides and ends are open, providing a light weight design which allows more complete visualization and display of the containers held in the tray. The floor preferably has an open grid-work design which not only is attractive and allows unwanted fluids to drain out of the tray, but also requires less plastic material and therefore is lighter and cheaper than a solid floor design. Stability corner posts extending downwardly and inwardly from the rail to the floor corner support areas can also be provided according to one preferred embodiment.

The tray can be dimensioned and configured for generally any type and number of beverage containers. As an example, one tray of this invention carries eight two-liter PET bottles and another carries twenty-four twelve ounce metal cans. These pull-top type of cans each have sharp top rims. Since the tray is molded of a plastic having a low coefficient of friction, a loaded top tray would slide too freely on the layer of can rims beneath it if the tray bottom were smooth. On the other hand, a sliding action is desirable when manually unloading a loaded tray off of a tall stack of trays. Accordingly, the bottom of the tray floor is molded with a pattern of redoubt members or downward protuberances to help locate an upper tray on a loaded lower tray beneath it. These protuberances are positioned so to define recessed areas between them up into which the rims of the layer of cans beneath it fit. The recessed areas should be wide enough to accommodate actual handling conditions, including cross-stacking patterns, wherein the cans do not line up precisely one on top of the other. On the other hand, the protuberances should provide enough surface area so they do not get worn off too quickly, as when a line of loaded trays are pushed along a concrete floor. Thus, the tray floor bottom is designed so that the recessed areas each have a sufficient clearance width and the remainder of the floor bottom comprises protuberance surfaces. Some of the protuberances are thus positioned within or inside their corresponding can rim and the remainder interstitially between a square of can rims. Some of the interstitial protuberances will also engage the perimeter of the floor. Thus, with the top tray located on a layer of cans beneath it the can rims are positioned in the recessed areas and the trays are in a locked position. The protuberances have their perimeter edges bevelled. Thus, with the trays in the locked position the top tray can be twisted a slight angle, the protuberances ride up their bevelled edges on the rims to an unlocked position and the loaded top tray slid freely on and along the rimmed cans beneath it.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 18 is a side elevational view of the second tray.

FIG. 19 is an end elevational view of the second tray.

FIG. 29 is a side elevational view of the third tray.

FIG. 30 is an end elevational view of the third tray.

FIG. 31 is a top perspective view of a fourth tray of the present invention.

FIG. 45 is a side elevational view of the sixth tray.

FIG. 46 is an end elevational view of the sixth tray.

FIG. 47 is a cross-sectional view taken along line 47—47 of FIG. 44.

FIG. 48 is a cross-sectional view taken along line 48—48 of FIG. 44.

DETAILED DESCRIPTION OF PREFERRED EMBODIMENTS OF THE INVENTION

Figure 1:
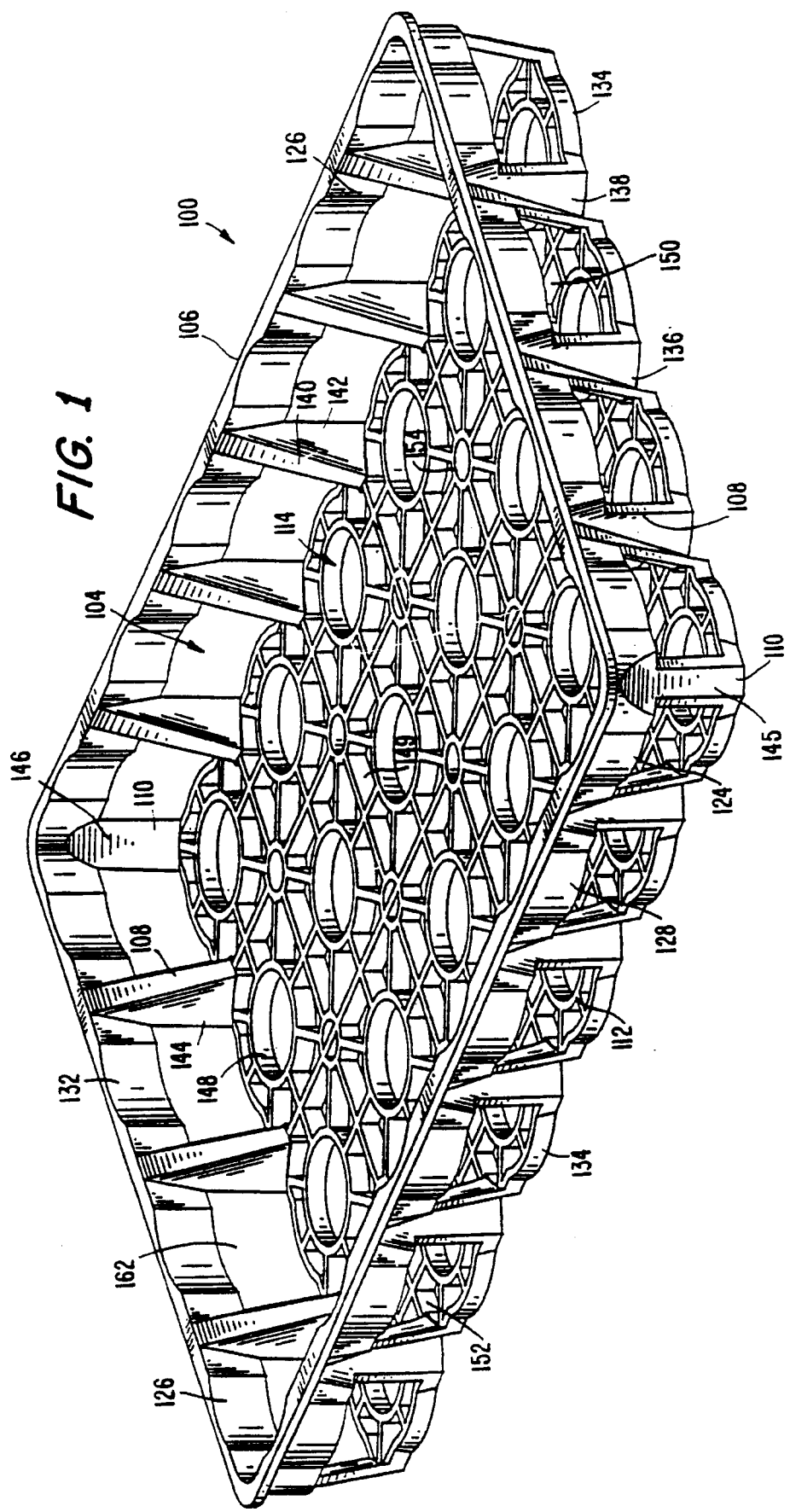
FIG. 1 is a top perspective view of a first tray of the present invention.

A number of variations of the present invention are possible, and some of them are illustrated in the drawings. This invention as will be explained can be adapted to hold generally any type of fluid container and is especially adaptable for twelve-ounce metal cans and two-liter PET bottles, and particularly those with vertical side walls. It can hold the containers (cans) in six packs or individually. A first preferred tray embodiment of the present invention is shown in FIGS. 1–14 generally at 100. Tray 100 is especially adapted for holding twelve-ounce metal cans, such as are typically used for soft drinks and beer and shown for example in FIG. 14 at 102. Tray 100 will be described in greater detail than the other trays, and the description thereof for corresponding parts can be referred to for the other later-described tray embodiments. Tray 100 and the other trays herein uniquely not only support the product therein over the entire tray height, but also nest compactly one within the other when empty.

Tray 100 is integrally molded from a plastic, such as a high density polyethelene, which is a standard container material, and in a sturdy, open light weight construction. Tray 100 comprises four basic components, namely, a floor 104, a rectangular rail 106 spaced above and generally parallel to the floor, a plurality of columns 108 extending between and interconnecting the floor 104 and the rail 106, and support posts 110 at each of the four corners of the tray 100 interconnecting the rail 106 and the floor 104 and providing additional corner support for the tray 100. These corner support posts 110 are, however, not required for this invention as will be apparent from some of the other embodiments described later herein.

Figure 14:
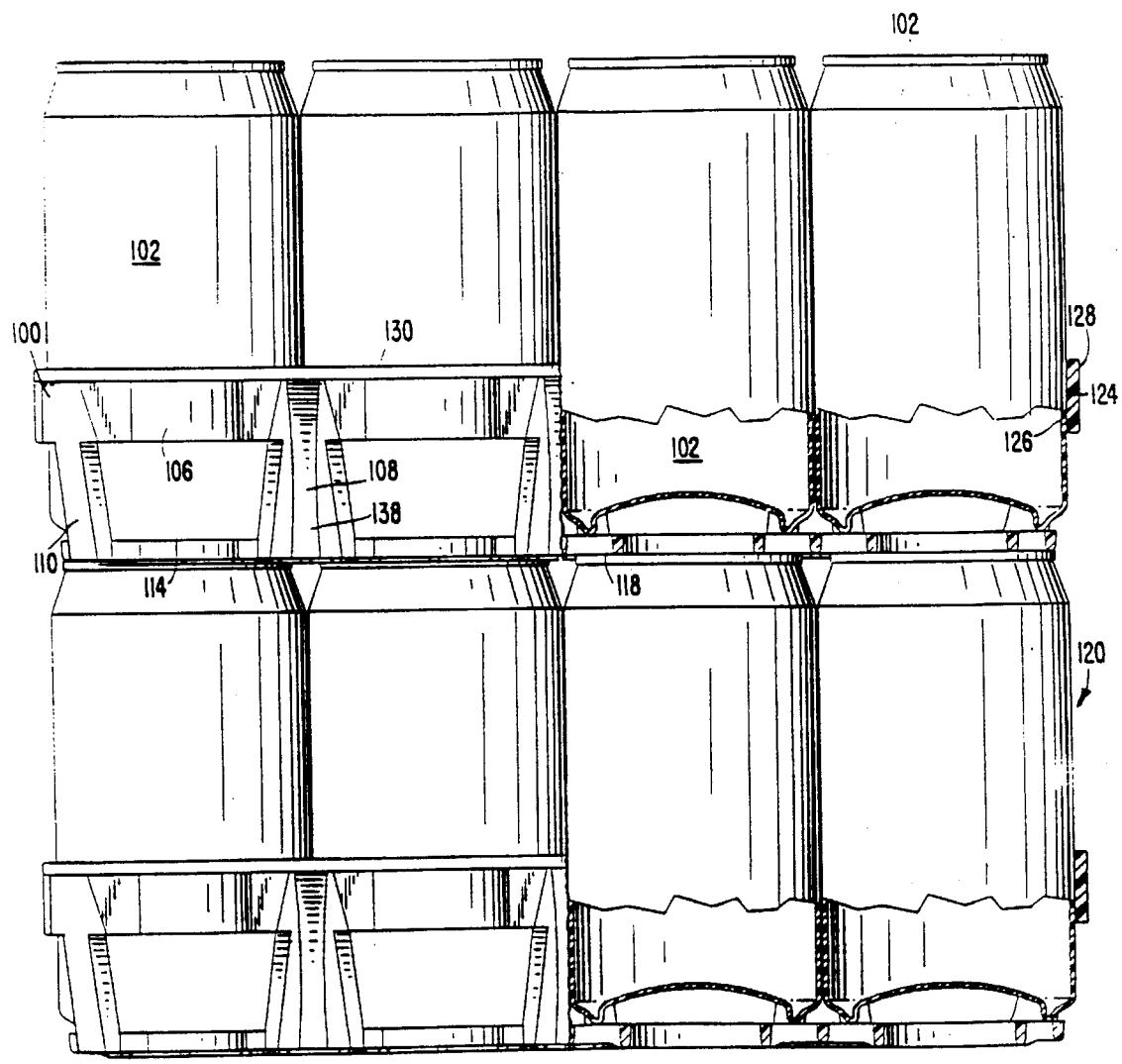
FIG. 14 is an end elevational view, with portions thereof broken away, of the first tray in a loaded and stacked position.

The floor 104 has an upper surface 112 defining a plurality (twenty-four) of fluid container support areas 114 for supporting thereon the fluid containers 102. Each support area 114 is generally 2.650 inch square. The floor bottom surface 116 has a plurality of receiving areas 118 for receiving thereon the tops of similar fluid containers in a layer in a similar tray directly beneath the floor, as depicted in FIG. 14 generally at 120 by a similar (identical) loaded tray. It is also within the scope of this invention to provide a plurality of beveled redoubt members positioned and spaced on and extending down from the floor bottom surface 116, such as are described in the previously-mentioned '039 application, and as will be described later in greater detail with respect to the tray (502) of FIGS. 44–51. These beveled redoubt members provide a sliding surface so that tray 100 when loaded can be easily slid along the lips of the can tops of a similar loaded tray 120 therebeneath without having to be lifted off therefrom thereby making it easier to handle the loaded and stacked trays.

The rail 106 is positioned by the columns 108 above the floor 104 a sufficient height to prevent the containers 102 held on the floor from tipping when the tray 100 is being transported. It is low enough, however, in a "low depth" configuration, so that the tops of the containers 102 on the floor 104 extend above it, and the containers themselves then directly support the weight of loaded trays thereabove, as can be understood from FIG. 14. Unlike the earlier-mentioned "Castle Crate" design, there is no need for any additional structure extending up from the rail 106 or from the central portion of the floor 104.

The rail 106 in turn comprises a band 124 having vertical inner and outer walls 126, 128 and a flange or lip 130 at the top thereof extending out a slight distance therefrom. The end corners of the band 124 and lip 130 are smoothly rounded. The vertical orientations of the inner and outer walls 126, 128 are shown in cross section in FIGS. 7, 10, 11, and 14. Since the outer wall 128 does not angle or flare, the overall dimensions of the tray 100 are kept to a minimum— about the same as that of a corrugated case. The tray 100 preferably has a total height of 2,000 inches, a width (as viewed in FIG. 2) of 10,750 inches and a length of 16,125 inches. The band 124 has an undulating or curving configuration having cylindrical, smooth surfaces 132 on inner wall 126 adjacent to and above each perimeter fluid container support area 114 and corresponding to the rounded sides of the containers 102 to be supported on the areas. The floor 104 also has an undulated perimeter design curving outwardly at locations 134 at each outer fluid container support area 114 for conforming generally to the cylindrical configuration of the bottom portions of the fluid containers 102.

Figure 7:
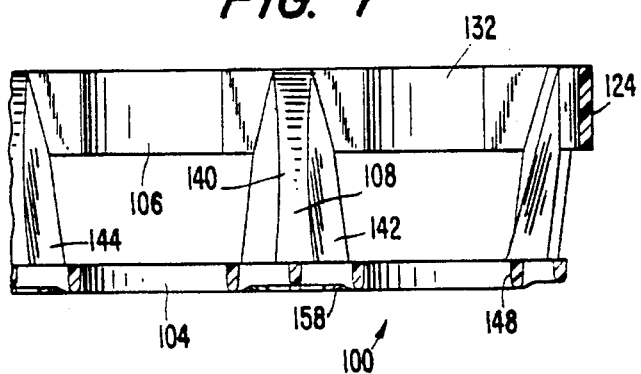
FIG. 7 is a cross-sectional view taken along line 7—7 of FIG. 2.
Figure 8:
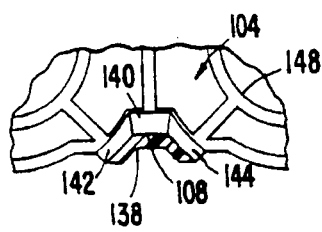
FIG. 8 is a cross-sectional view taken along line 8—8 of FIG. 4.
Figure 9:
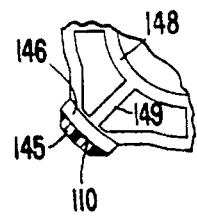
FIG. 9 is a cross-sectional view taken along line 9—9 of FIG. 5.
Figure 10:
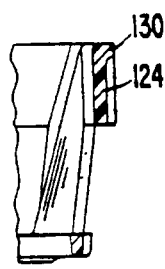
FIG. 10 is a cross-sectional view taken along line 10—10 of FIG. 2.
Figure 11:
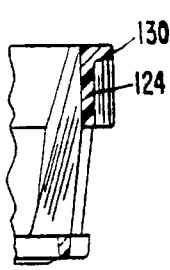
FIG. 11 is a cross-sectional view taken along line 11—11 of FIG. 2.
Figure 12:
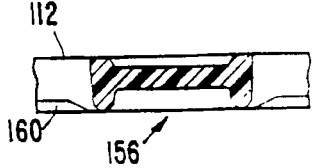
FIG. 12 is a cross-sectional view taken along line 12—12 of FIG. 2.
Figure 13:
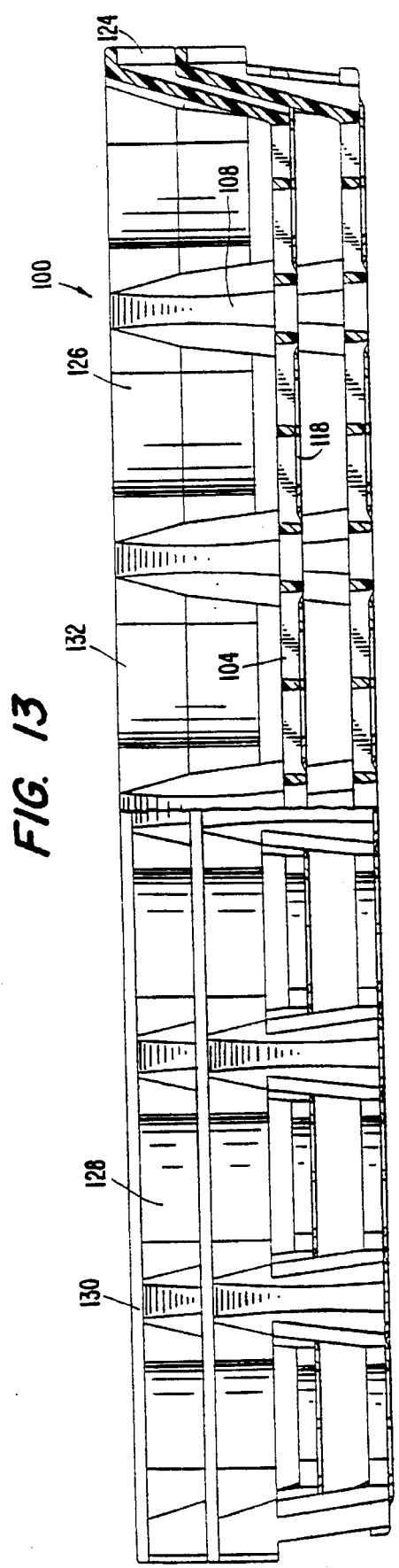
FIG. 13 is a side elevational view, with portions thereof broken away, of the first tray in an empty and nested position.

The columns 108 extend upwardly from the floor 104 to the rail 106 and between each of the support areas 116 where the undulating perimeter curves in at location 136. These columns 108 are each formed as a generally truncated conical member defining a vertical slot 138 disposed outwardly relative to the floor 104. The inwardly disposed surfaces of the columns 108 have three faces, each of which angles upwardly and outwardly from the floor to the rail. The middle face 140 is flat, and the outer two faces 142, 144 are generally sidewardly oriented and have truncated conical configurations. The configuration of these faces can be seen, for example, in FIGS. 1, 6, 7, and 8. Surface face 142 as shown in FIG. 7 is preferably constructed from a cone having a base radius of 1.300 inches, an incline of ten degrees per side and a wall thickness of 0.100 inch. The inward surfaces of the columns 108 are thus generally conically shaped, angling towards the longitudinal center line thereof, and the cans 102, even when held loose, do not contact the immediately adjacent columns even during normal transport movement of the tray 100. The slots 138 are correspondingly configured to receive up thereinto the inner surfaces of columns of another tray as shown in FIG. 13, to provide a deeply nested arrangement. Each additional empty tray 100 then adds only the narrow height of its rail 106 to the stack of empty nested trays therebeneath, which additional height is only about three-quarters of an inch, as can be understood from FIG. 13, for example.

The corner support posts 110 also angle inwardly and downwardly and have conical outer and inner surfaces 145, 146 (same as the columns—see FIG. 9) to slide along and relative to one another when the trays are sliding into and out of their empty nested position which is depicted in FIG. 13.

The upper floor surface 112 can be smooth and planar across its entire expanse. Alternatively, it can have indents or recessed areas at each of the support areas 114 for receiving therein the bottoms of each of the fluid containers 102; or it can have low-height divider ribs on the surface thereof, separating the support areas 114 as will be explained later with reference to FIGS. 31–43.

Figure 2:
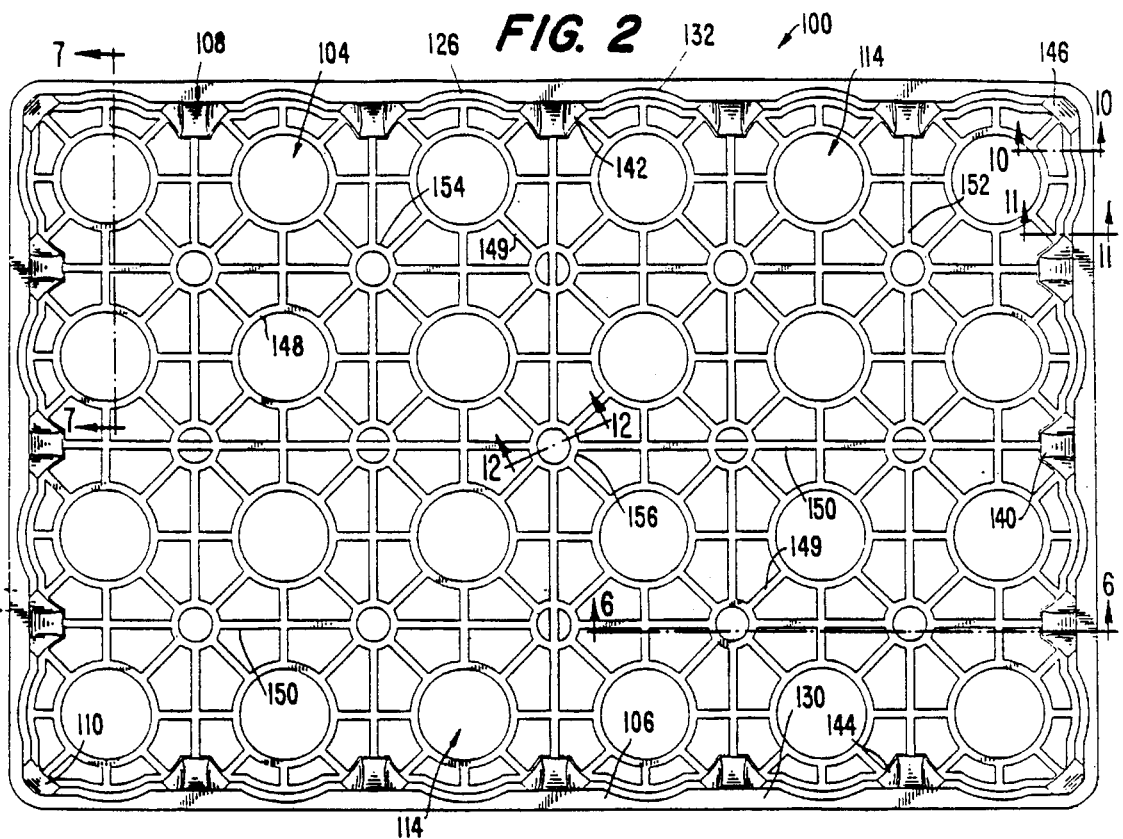
FIG. 2 is a top plan view of the first tray.
Figure 3:
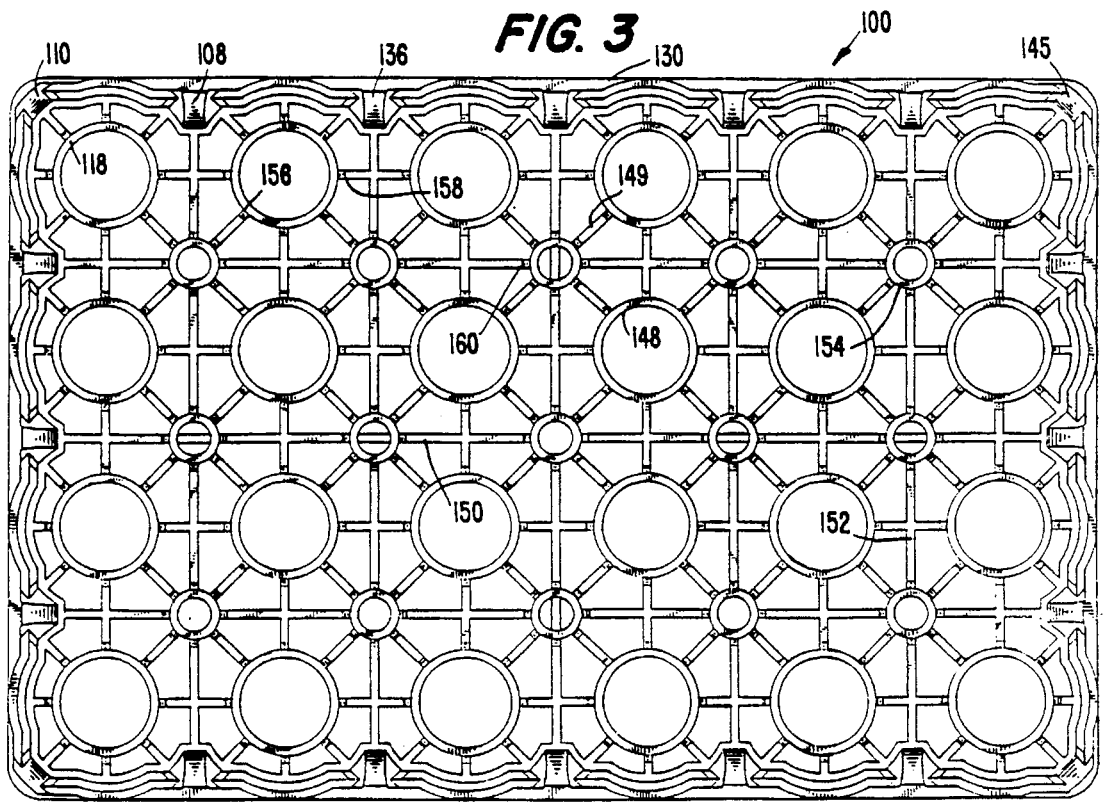
FIG. 3 is a bottom plan view of the first tray.
Figure 4:
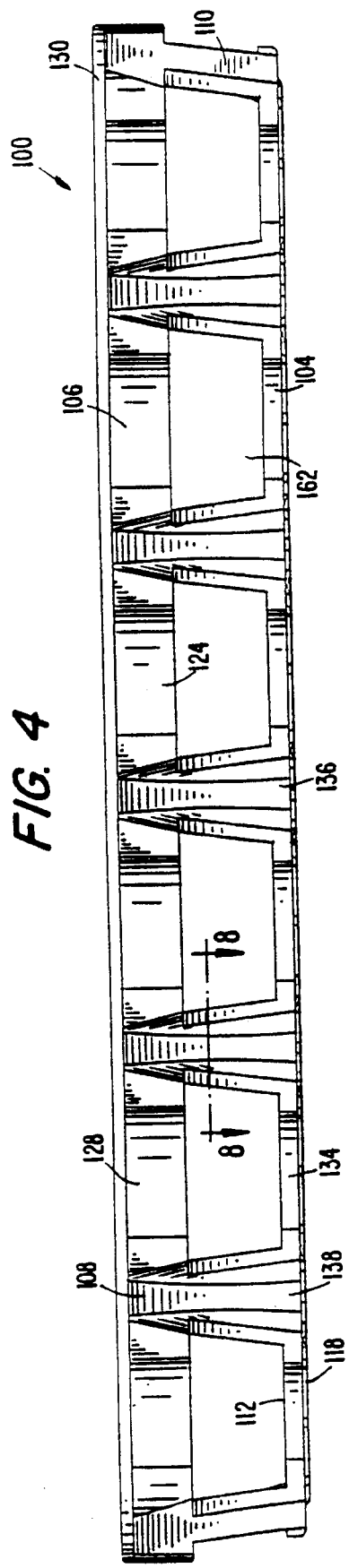
FIG. 4 is a side elevational view of the first tray.
Figure 5:
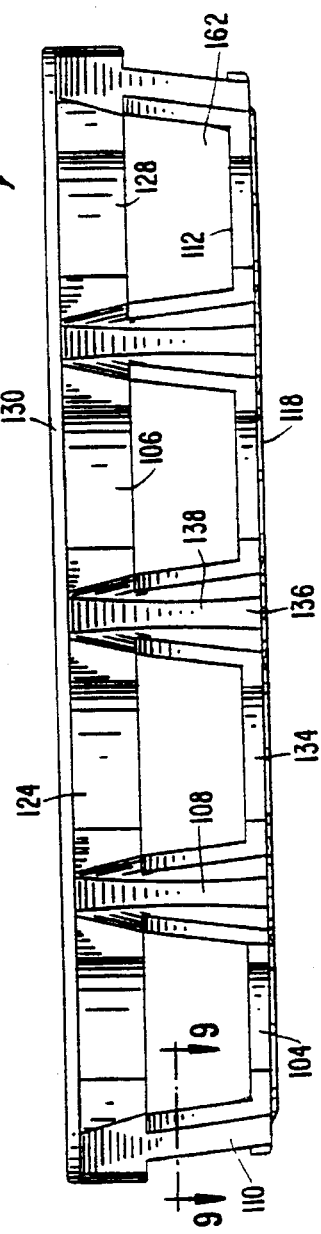
FIG. 5 is an end elevational view of the first tray.
Figure 6:
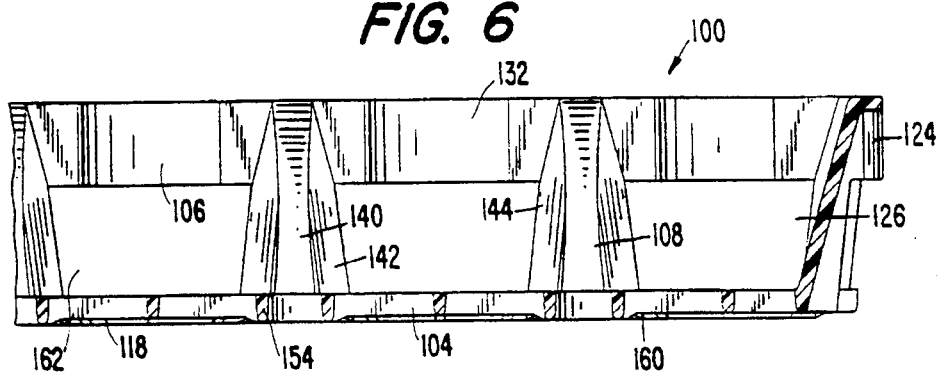
FIG. 6 is a cross-sectional view taken along line 6—6 of FIG. 2.

A preferred design is to mold the floor 104 with a gridwork-like configuration having a pattern of open spaces therethrough, as shown in FIGS. 1–3 (and 26–28), so that less plastic floor material is needed. The floor 104 is thereby made cheaper and lighter, and an attractive design is thereby presented. Any liquids, such as condensation, rain water or beverages leaking from damaged containers, can drain therethrough. This gridwork-like design preferably comprises a plurality of circular members 148, one for each support area 114. Each of these circular members 148 is slightly smaller than the bottom of the fluid containers 102 to be supported thereon. A plurality of radial struts 149 extends radially out from each of the circular members 148 to suspend or support them. The circular members 148 are arranged in rows and columns to thereby define one or more arrays, as illustrated in FIG. 2 for example. In the preferred design of FIGS. 1–14 (and 26–30) there are four two-by-three arrays to accommodate four six-packs of cans; in other words, there are twenty-four support areas 114 in a four-by-six arrangement. The circular members 148 form a strong support structure and make it relatively easy to count the number of support areas 114 in an empty tray 100 and also to position the fluid containers 102 on the floor 104.

The gridwork floor 104 also comprises a plurality of longitudinal and lateral struts 150, 152, extending (discontinuously) the full length and width, respectively, thereof and between the rows and columns of the circular members 148. The radial struts 149 then extend to or through these lateral and longitudinal struts. At the intersections of the longitudinal and lateral struts 150, 152 smaller circular members 154 are formed and are thereby positioned in the center of a square of the larger circular members 148 as can be seen in FIGS. 2 and 3, for example. One interesting pattern extends the central longitudinal strut 150 through each of the smaller circular members 154 except for the center one 156 (FIG. 12) and the central lateral strut 152 through the centers of each of the smaller circular members 154 except for the center one 156, and the remaining smaller circular members 154 then are fully open.

The floor bottom surface 116 is recessed upwardly at each receiving area 118 for receiving thereinto the tops of fluid containers 102 in a layer in a tray 120 beneath the floor 104 in a preferred design of this invention. These recessed receiving areas are shown for example in FIGS. 3, 7, and 13, and can be understood from comparing the tops of the bottom left two cans with the right two cans in FIG. 14. Each recess 158 is formed simply by having the bottom surfaces of radial struts 149 angling from locations 158 (FIGS. 3 and 7) spaced a slight distance from the larger circular members 148 to the larger circular members and locations 160 (FIGS. 3, 6 and 12) spaced from circular members 154. Any similar construction for holding the floor bottom surface 116 to the tops of a bottom container layer therebeneath, as would be apparent to those skilled in the art, to prevent free sliding is within the scope of this invention.

Looking at the ends and sides of the tray 100, it is seen that the areas between adjacent columns 108 and the floor 104 and the rail 106 define open spaces 162. This design requires less plastic then a more solid design and thereby forms a tray which is lighter, cheaper and more attractive. It further allows the fluid containers 102 therein to be more completely seen, especially when loaded or partially loaded trays are stacked one on top of the other, as depicted in FIG. 14.

Figure 15:
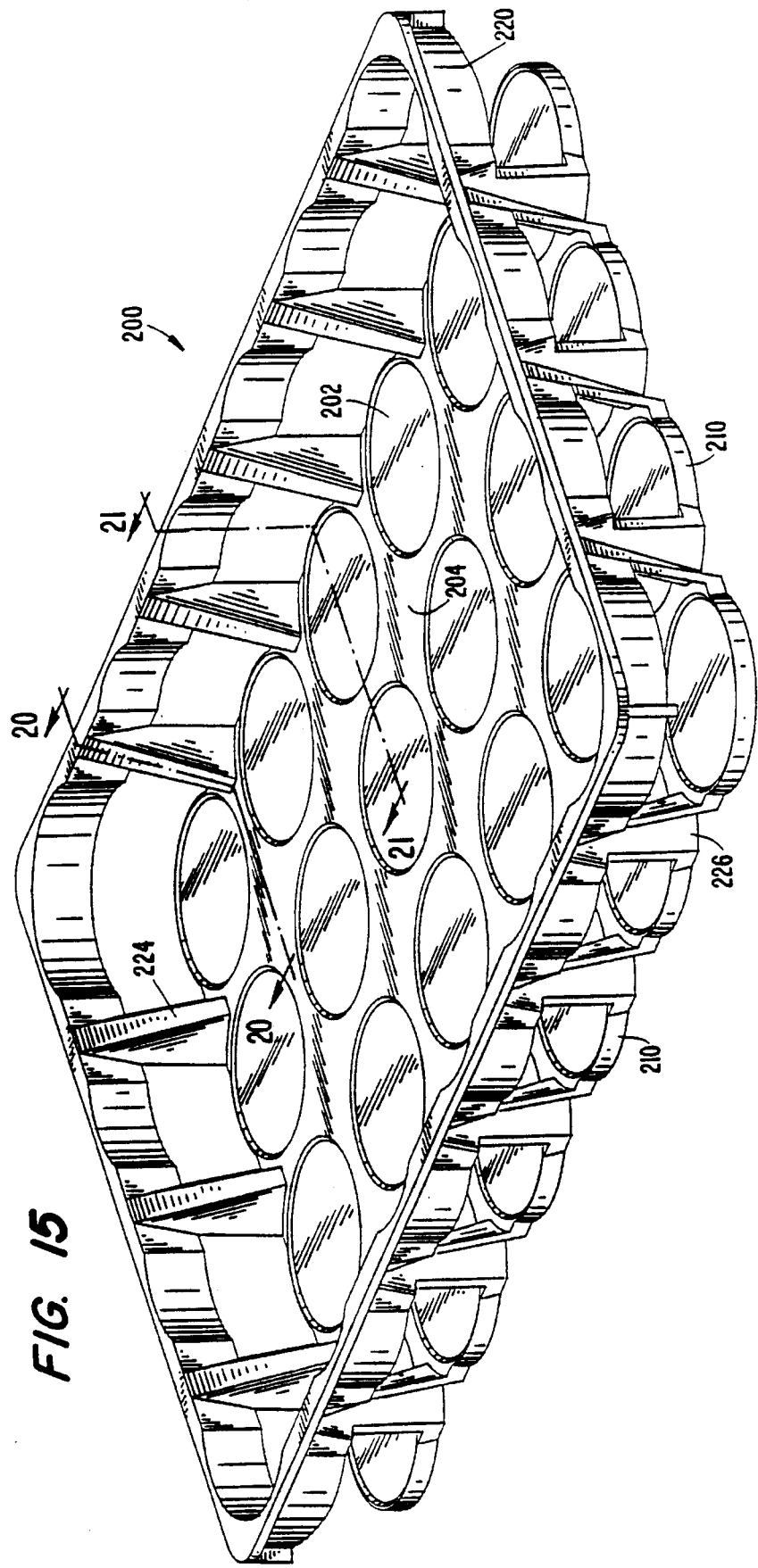
FIG. 15 is a top perspective view of a second tray of the present invention.
Figure 16:
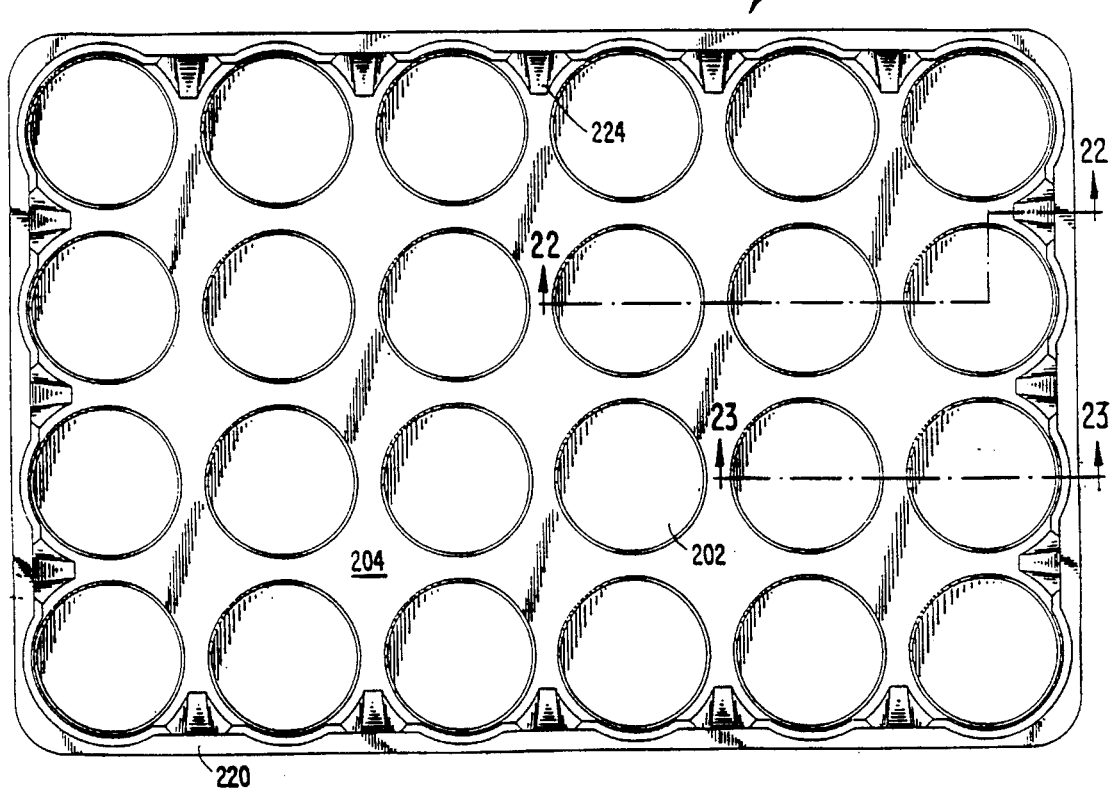
FIG. 16 is a top plan view of the second tray.
Figure 17:
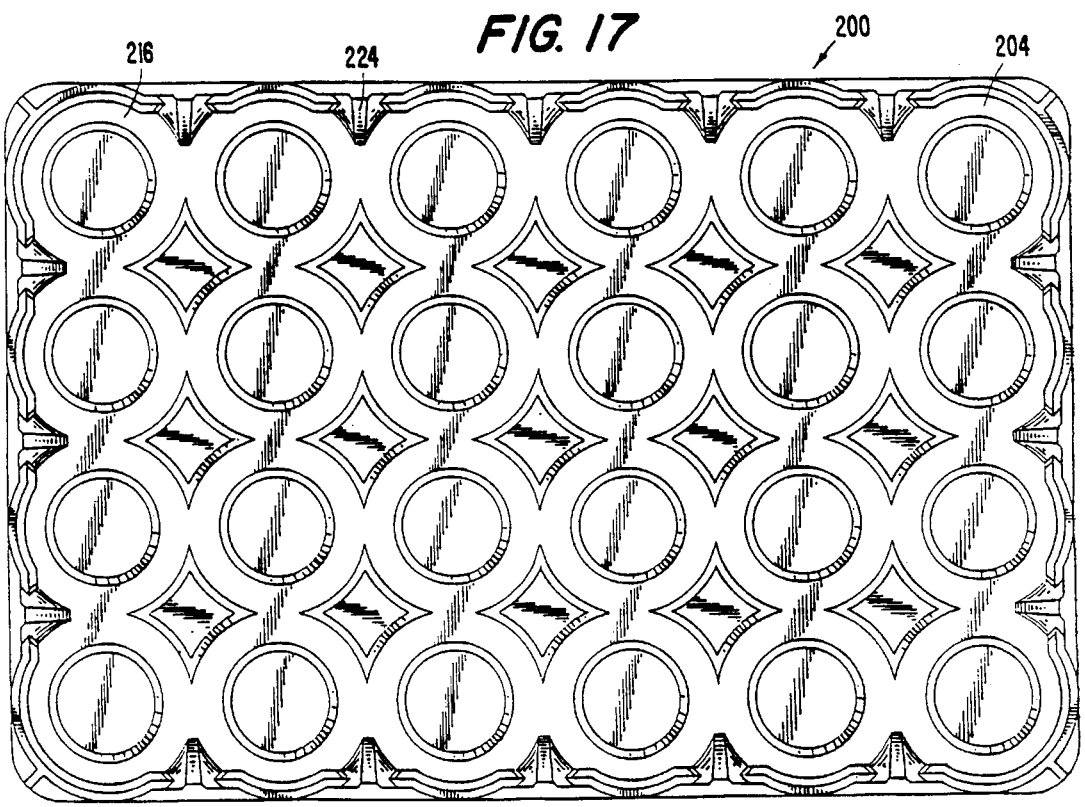
FIG. 17 is a bottom plan view of the second tray.
Figure 20:
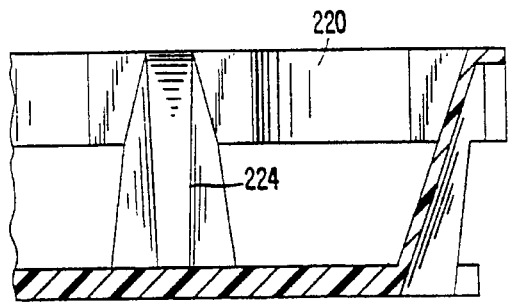
FIG. 20 is a cross-sectional view taken along line 20—20 of FIG. 15.
Figure 21:
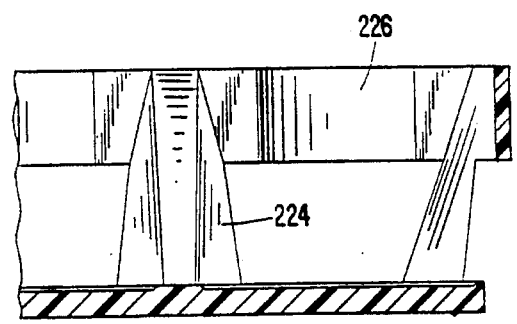
FIG. 21 is a cross-sectional view taken along line 21—21 of FIG. 15.
Figure 22:
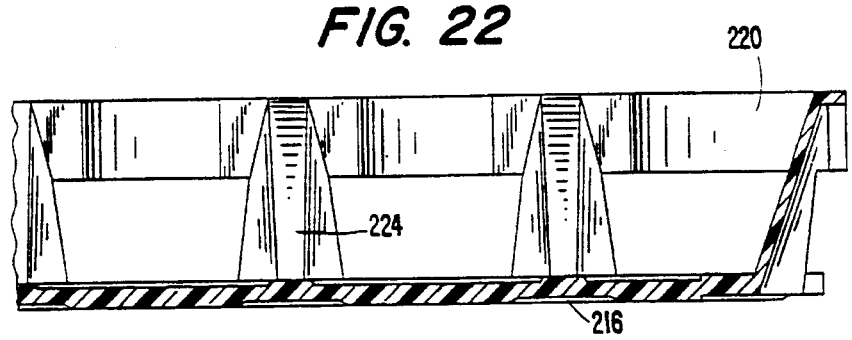
FIG. 22 is a cross-sectional view taken along line 22—22 of FIG. 16.
Figure 23:
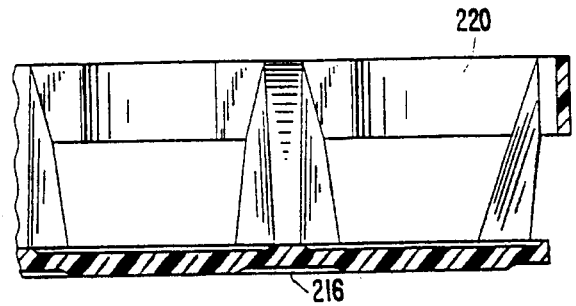
FIG. 23 is a cross-sectional view taken along line 23—23 of FIG. 16.
Figure 24:
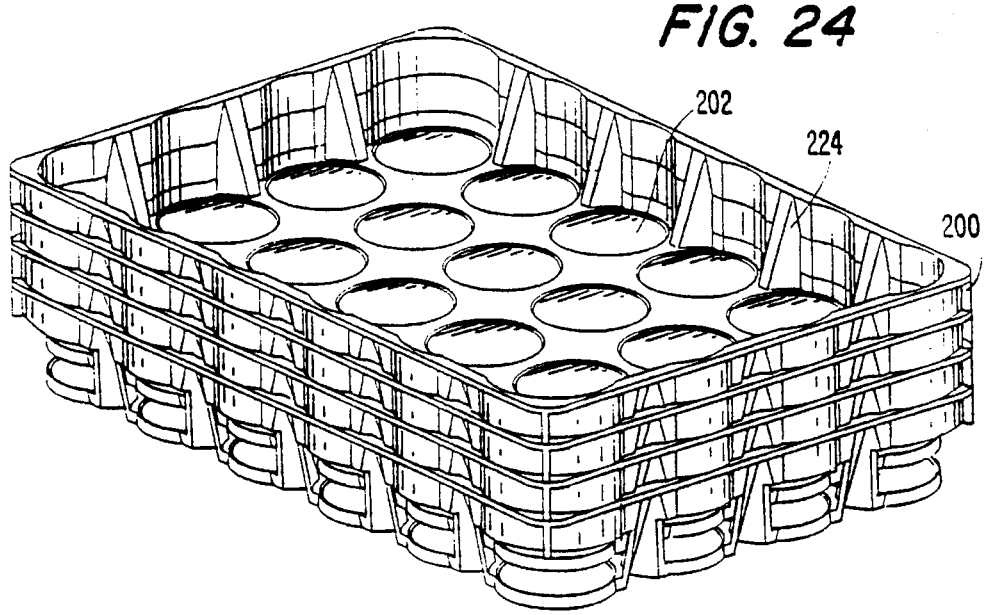
FIG. 24 is a top perspective view of the second tray shown in an empty and nested position.
Figure 25:
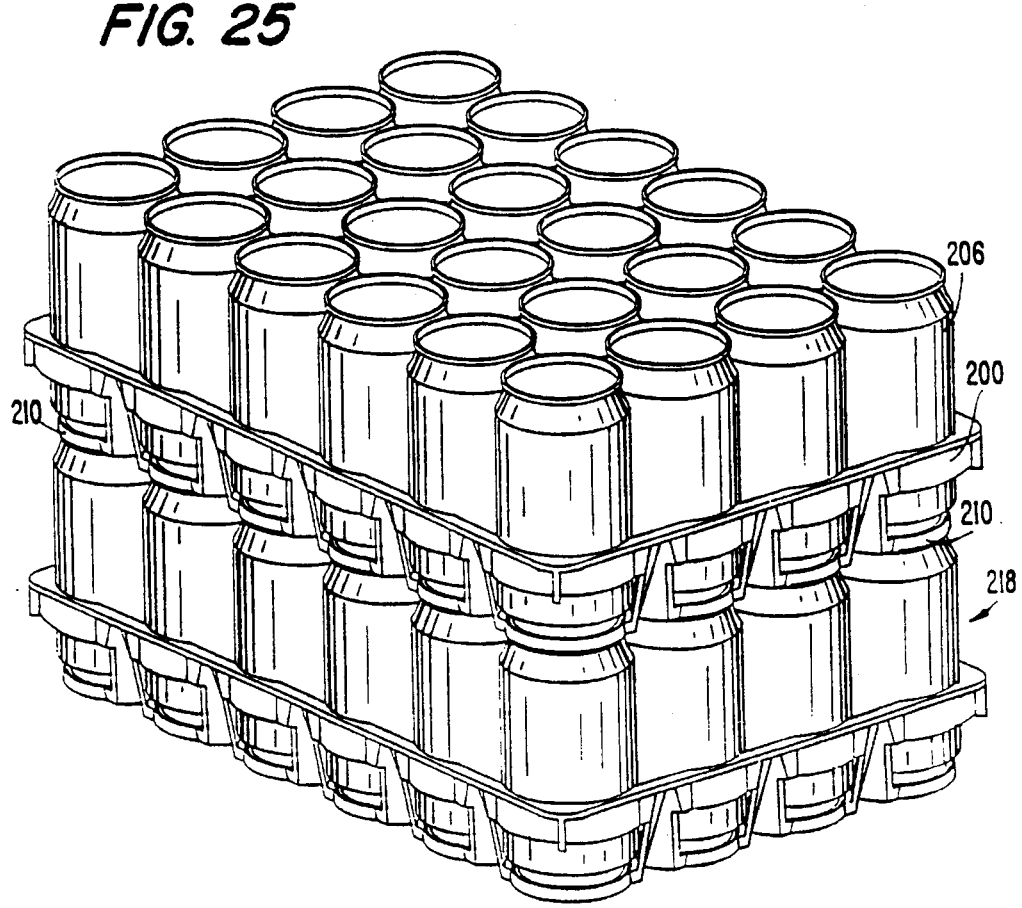
FIG. 25 is a top perspective view of the second tray shown in a loaded and stacked position.
Figure 26:
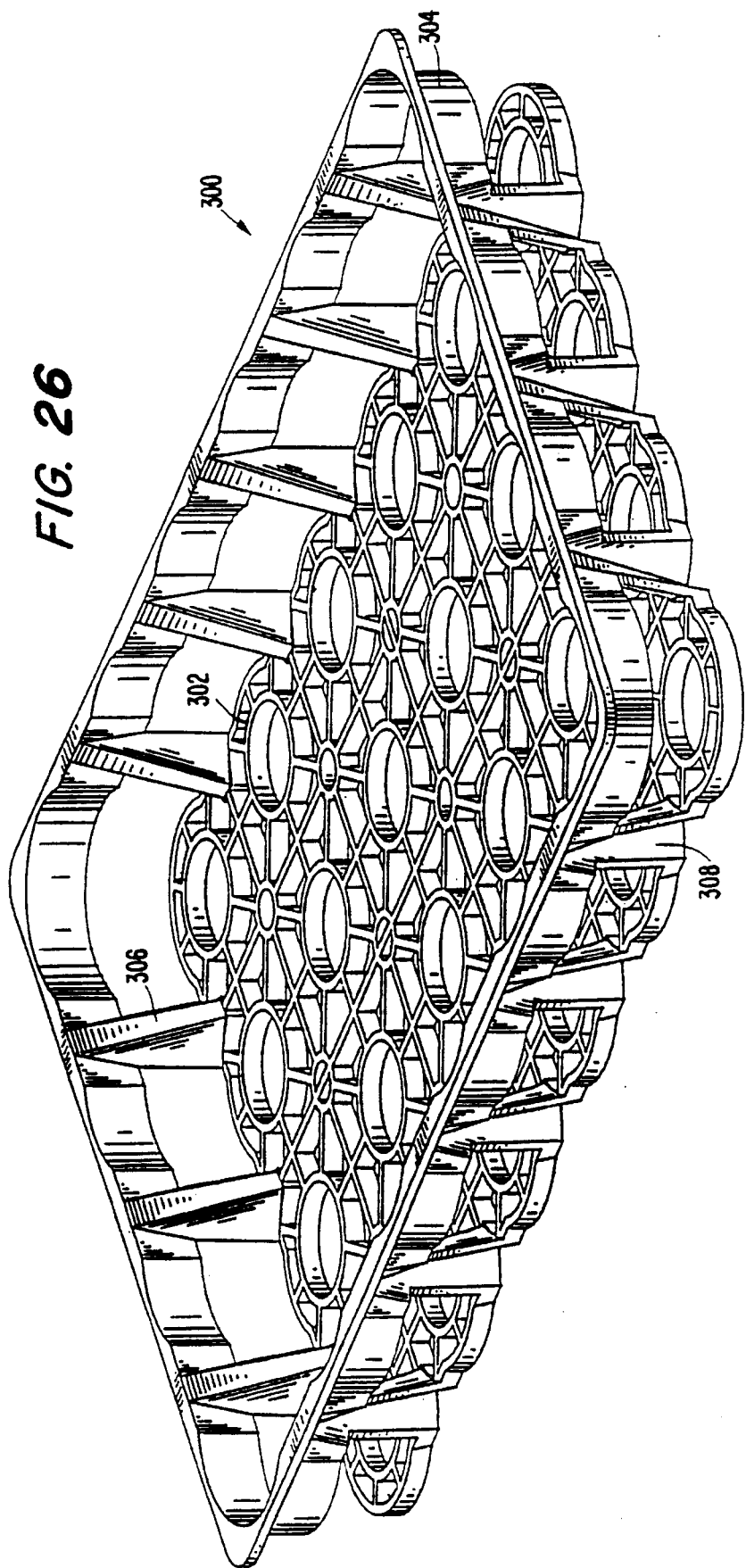
FIG. 26 is a top perspective view of a third tray of the present invention.
Figure 27:
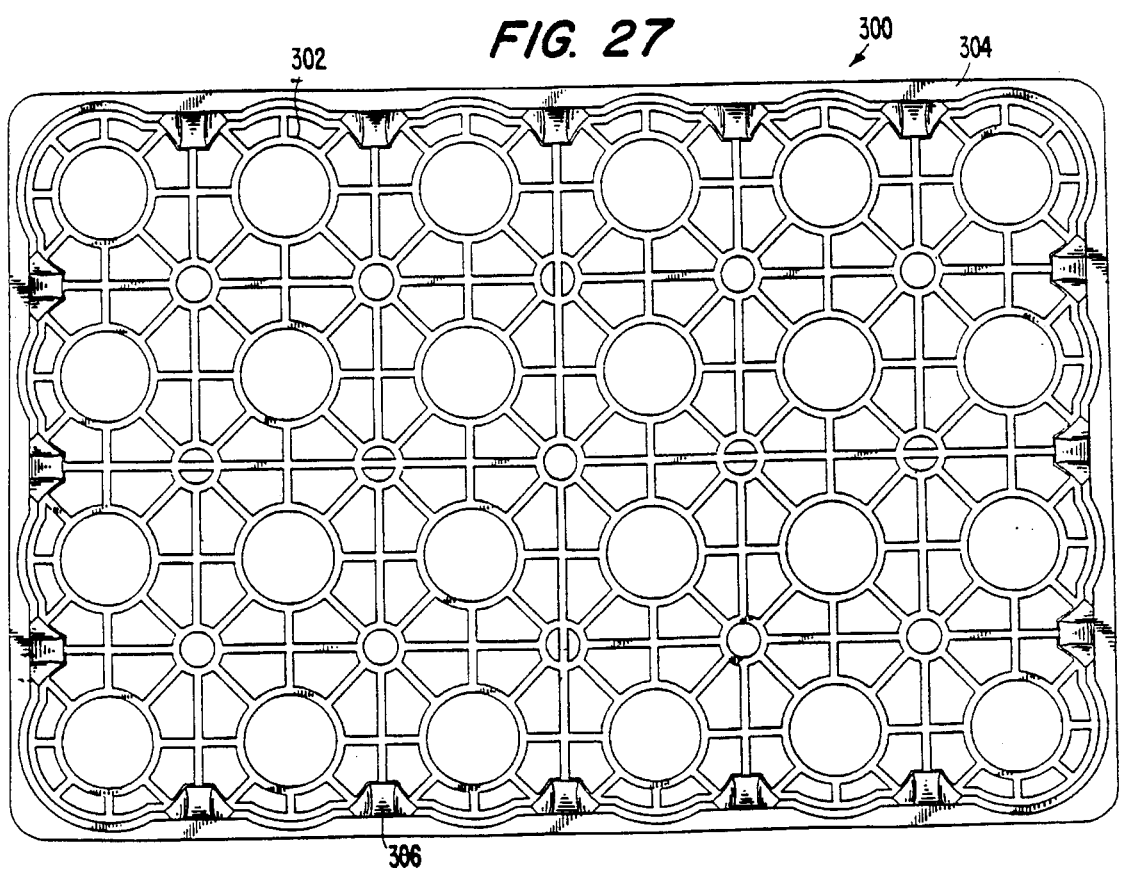
FIG. 27 is a top plan view of the third tray.
Figure 28:
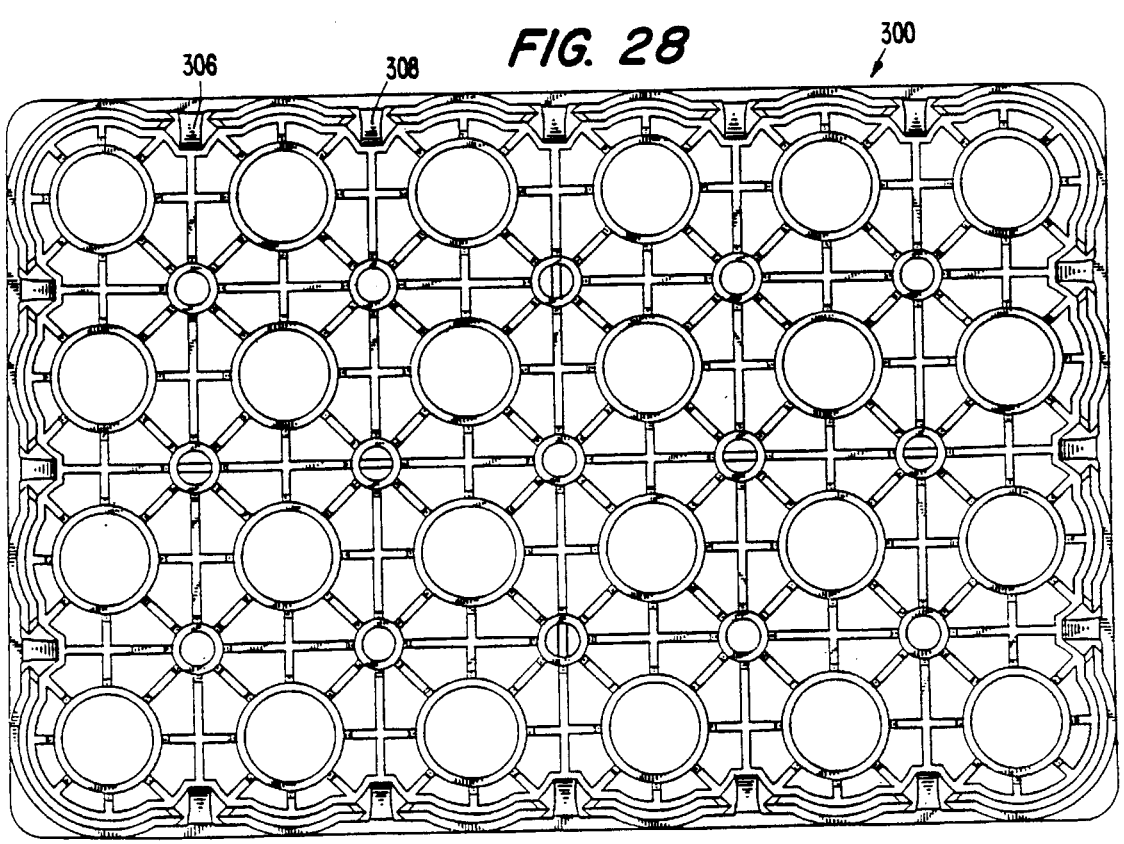
FIG. 28 is a bottom plan view of the third tray.
Figure 32:
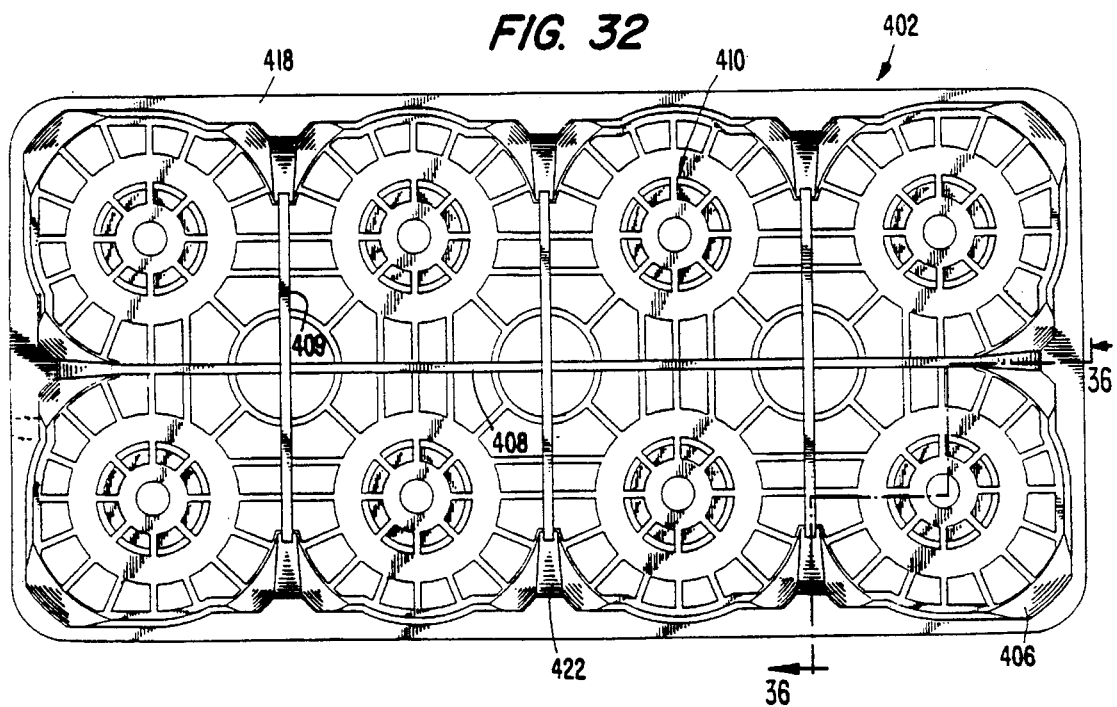
FIG. 32 is a top plan view of the fourth tray.
Figure 33:
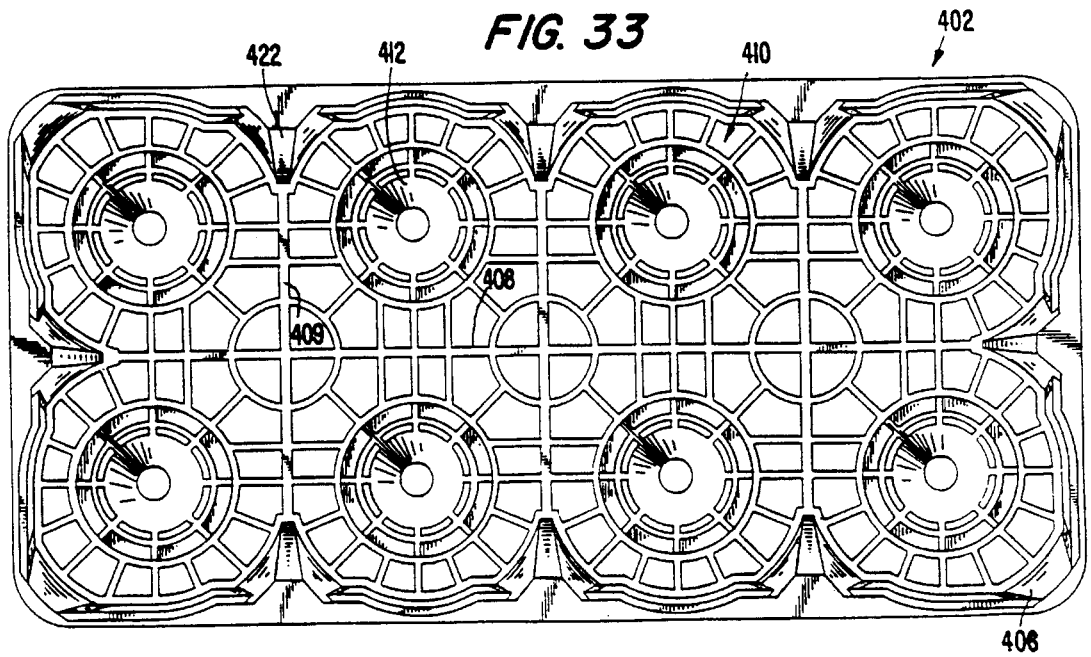
FIG. 33 is a bottom plan view of the fourth tray.
Figure 34:
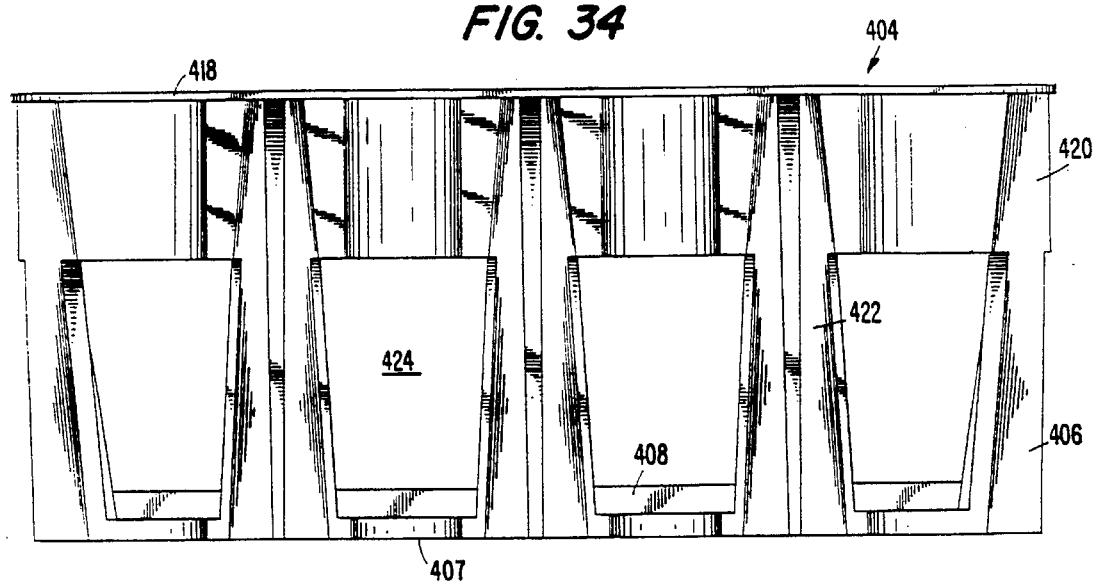
FIG. 34 is a side elevational view of the fourth tray.
Figure 35:
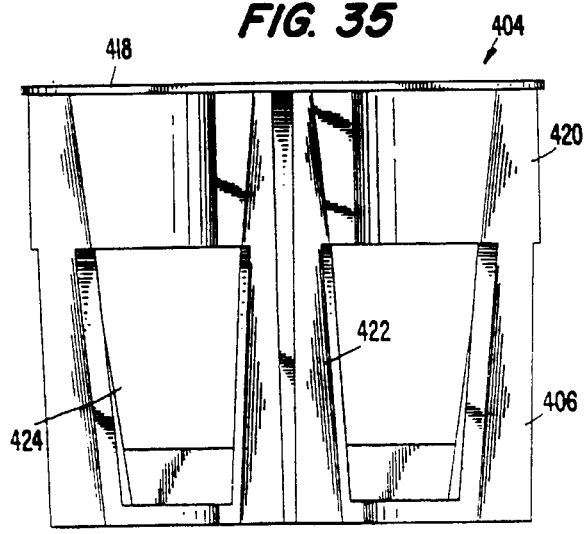
FIG. 35 is an end elevational view of the fourth tray.
Figure 36:
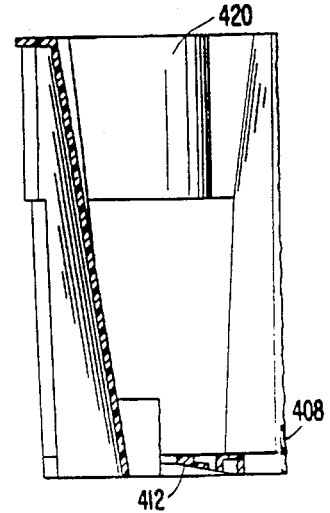
FIG. 36 is a cross-sectional view taken along line 36—36 of FIG. 32.

An alternative design of the present invention uses a "solid" floor configuration instead of the open gridwork-like design of tray 100. A solid design is illustrated by the tray shown generally at 200 of FIG. 15, for example, wherein a plurality of circular recesses 202 is formed in the upper surface of the floor 204 for receiving therein the bottom edges of the fluid containers or metal beverage cans 206. When viewed from the top as in FIG. 16 an array of rings is thereby defined. From the sides as shown in FIGS. 18 and 19, the perimeter of the floor 204 then is similar to the configuration of the floor 104 of tray 100 and comprises a series of arcuate surfaces 210. The bottom surface of the floor 204, as shown in FIGS. 17 and 22, has circular recesses 216 formed up thereinto for receiving therein the top rims of the cans 206 and thereby preventing free sliding of an upper loaded tray 200 on a similar bottom loaded tray as shown generally at 218 in FIG. 25. Tray 200 similarly has a rail 220, and angled columns 224 between the arcuate surfaces 210 and defining outward slots 226. Although tray 200 is not shown to have corner support posts, it is within the scope of this invention to provide such support posts for the FIG. 15 embodiment, similar to those shown in FIG. 1.

The tray as shown generally at 300 in FIGS. 26–30 is, generally speaking, a cross between trays 100 and 200. It has the gridwork-like floor 302 of tray 100 and like tray 200 does not have any corner support posts. Similar to trays 100 and 200 it has a rail 304 and angled columns 306 defining outwardly-disposed receiving slots 308. Thus, the tray 300 of FIG. 26, for example, can receive therein loose (or packaged as with a thin plastic film or an upper plastic holder) cans or similar containers in an array, such as a four-by-six array, and hold them securely, preventing them from tipping or rubbing against each other even during the movements normally associated with the transport and handling thereof. The trays 300, when loaded, also securely stack one on top of another as can be understood from FIG. 25. The trays 300 when empty can be nested one on top of the other for storage or transport, and similar to trays 100 and 200, each empty tray 300 adds only the narrow height of its rail 304 to the stack of empty trays when nested therein.

The general concept of this invention can be easily adapted for handling other containers of different sizes and shapes. An example is illustrated in FIGS. 31 through 43 for two-liter PET bottles, such as are shown at 400 in FIG. 38, wherein two embodiments are illustrated, the first shown generally at 402 in FIGS. 31 through 38 and the second shown generally at 404 in FIGS. 39 through 43. The only difference between them is the inclusion of the corner support posts 406 in the embodiment of FIG. 31. The posts 406 serve a similar outer support function for the overhanging support area corners of the floor 407.

Longitudinal and lateral divider struts 408, 409 extend across and along the floor 407 to separate the individual support areas 410 from each other, to hold the bottles 400 better in place and to prevent them from tipping. As can be seen, the three lateral divider struts 409 are taller than the single longitudinal strut 408. This holding function is more important for the plastic bottles 400 than it is for the can trays 100, 200, 300 because of the greater likelihood that the tall, flexible bottles 400 will buckle if they tip when stacked. The trays (or carriers) 402, 404 of FIGS. 31 through 43 are designed to support and carry eight bottles 400. It is, of course, within the scope of the present invention to size the trays 402, 404 differently to carry either more or fewer bottles, and/or bottles or other containers of different sizes and/or shapes.

Figure 37:
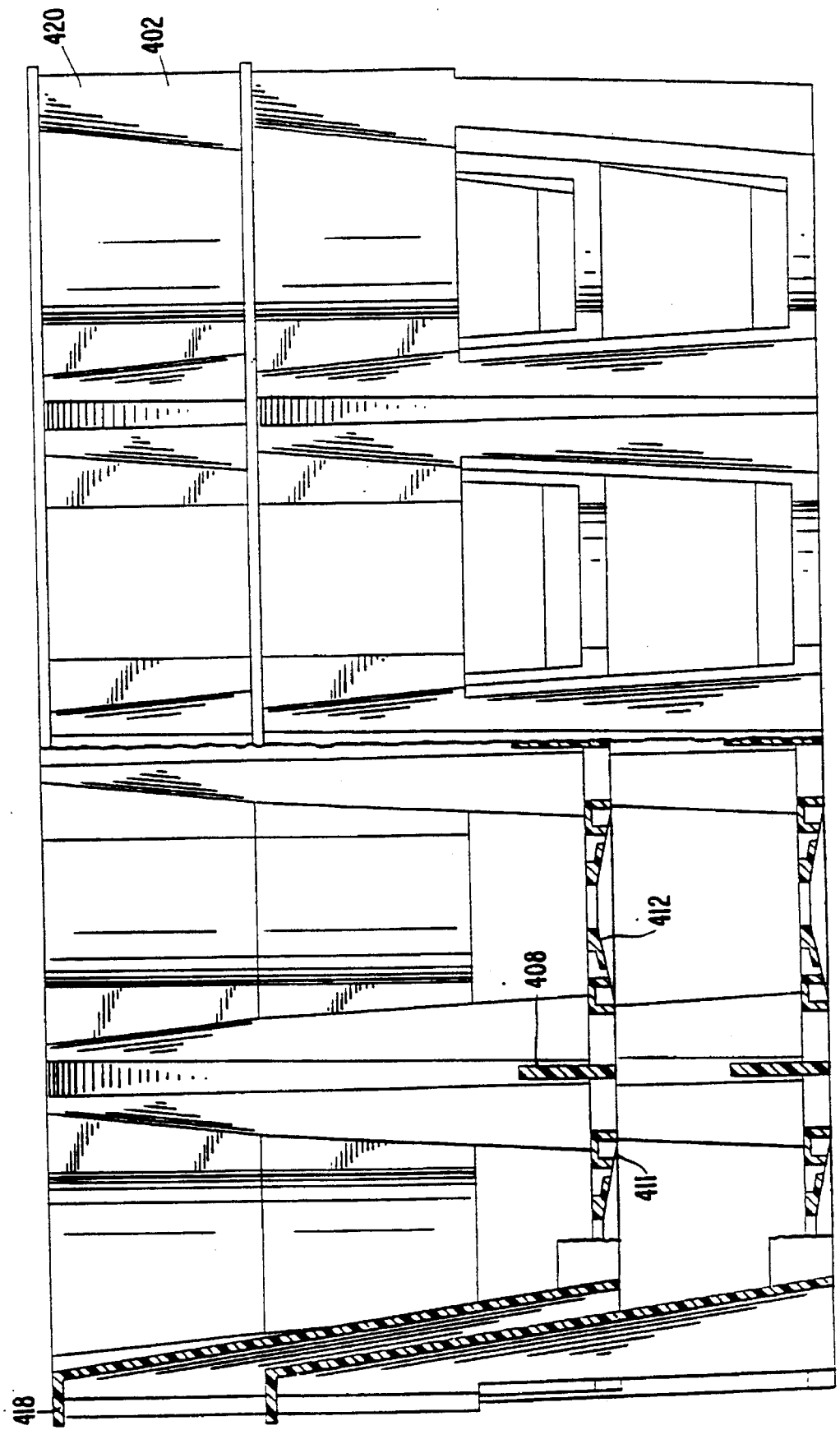
FIG. 37 is a side elevational view, with portions thereof broken away, of the fourth tray shown in an empty and nested position.
Figure 38:
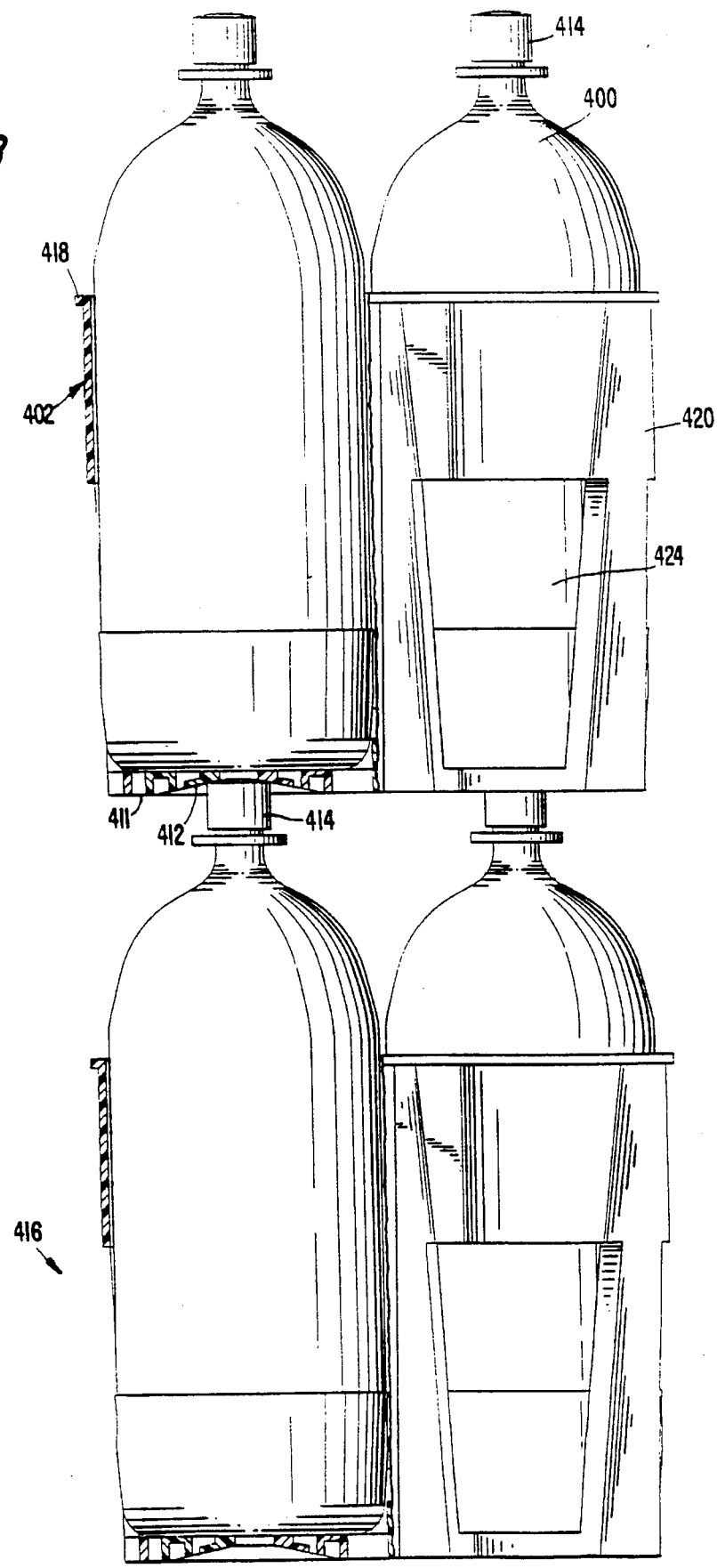
FIG. 38 is a side elevational view, with portions thereof broken away, of the fourth tray in a loaded and stacked position.
Figure 39:
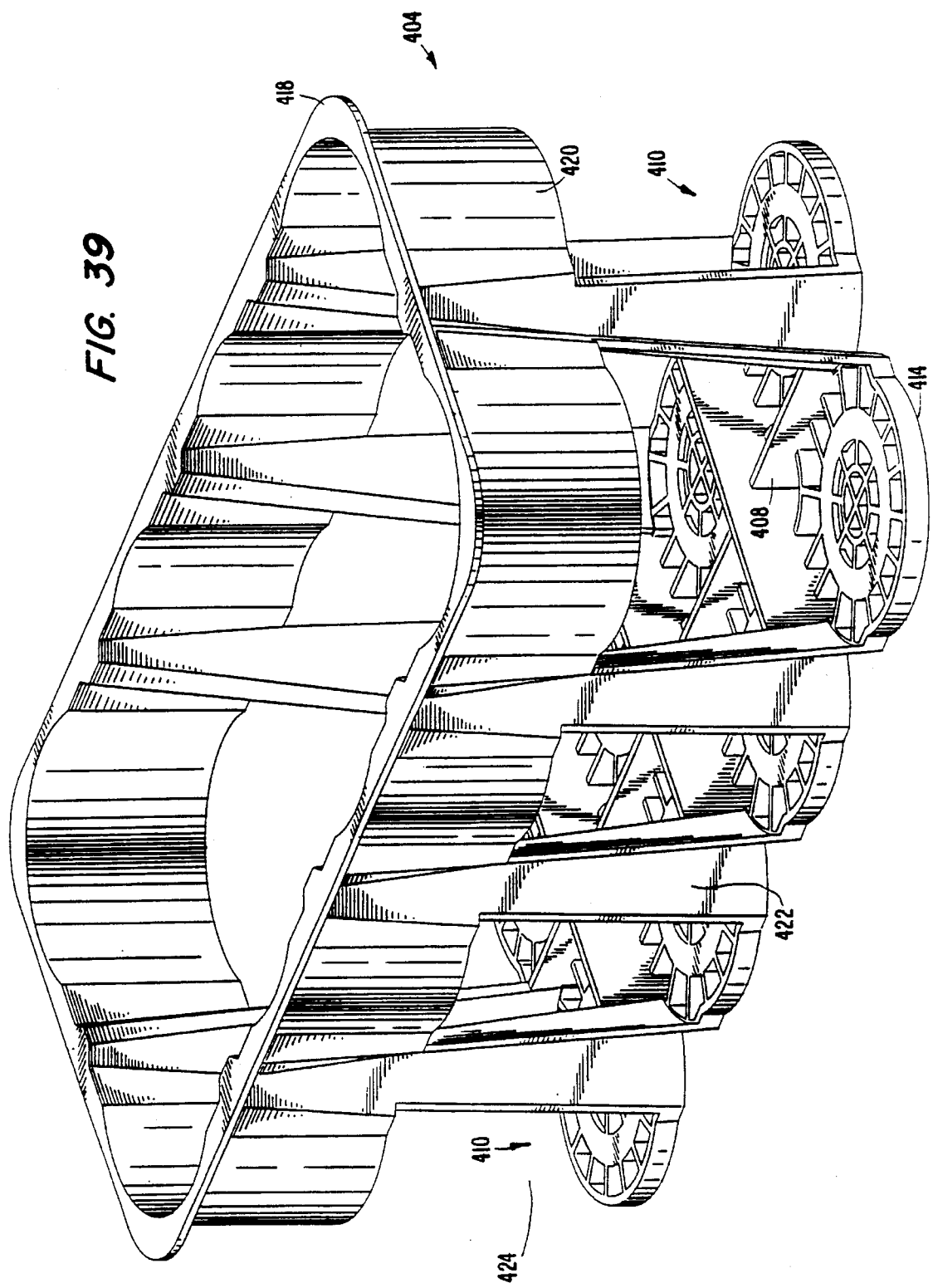
FIG. 39 is a top perspective view of a fifth tray of the present invention.
Figure 40:
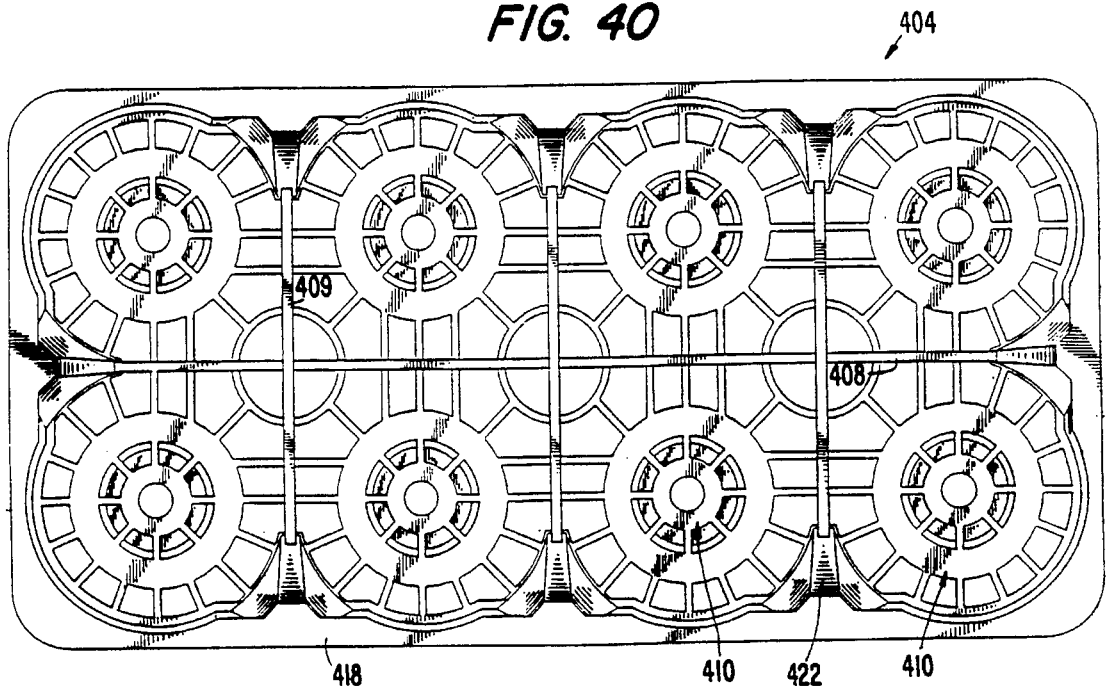
FIG. 40 is top plan view of the fifth tray.
Figure 41:
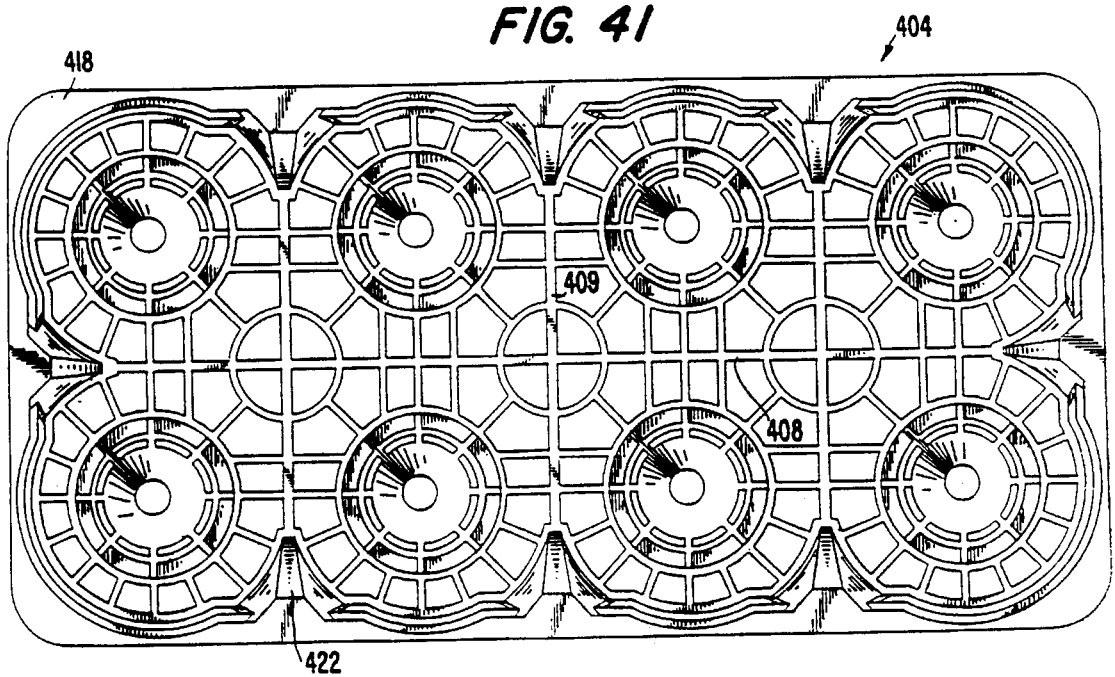
FIG. 41 is a bottom plan view of the fifth tray.
Figure 42:
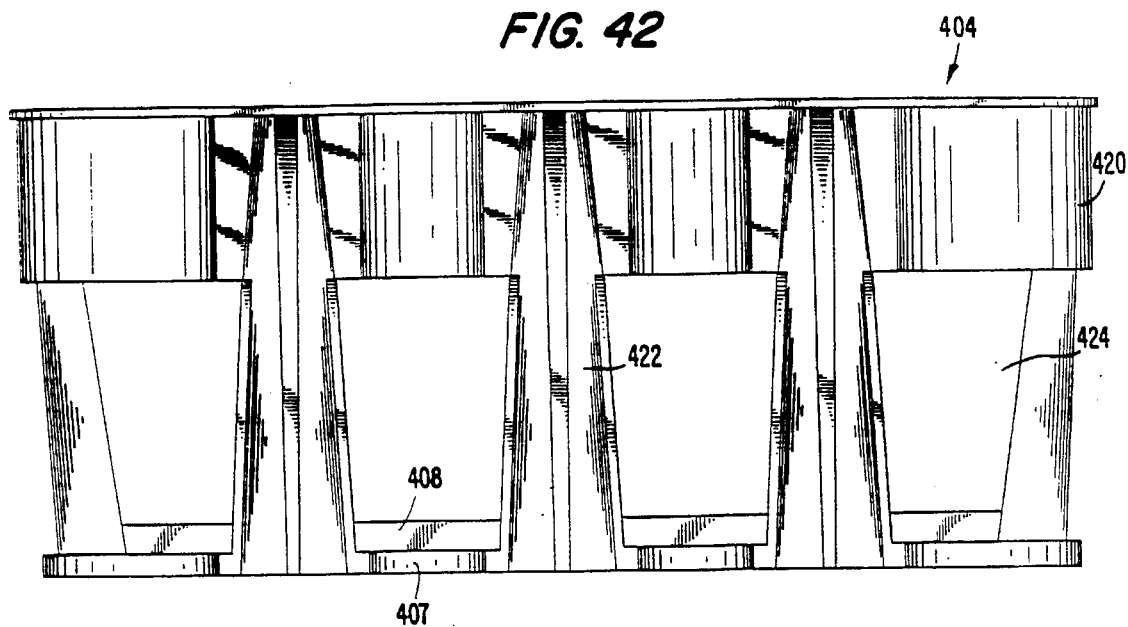
FIG. 42 is a side elevational view of the fifth tray.
Figure 43:
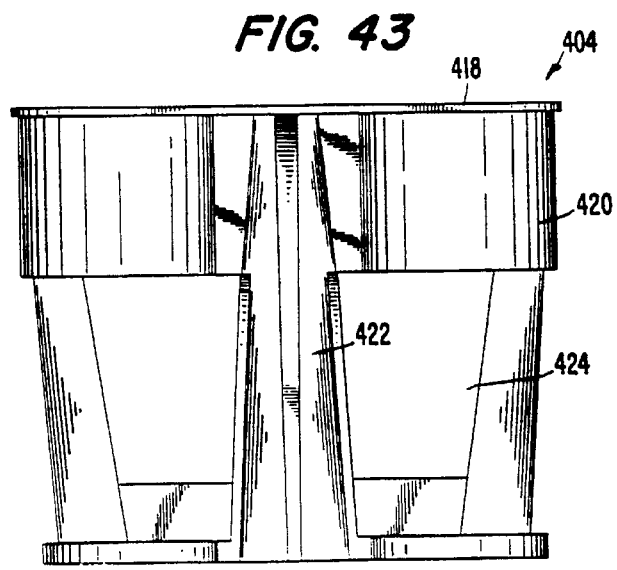
FIG. 43 is an end elevational view of the fifth tray.
Figure 44:
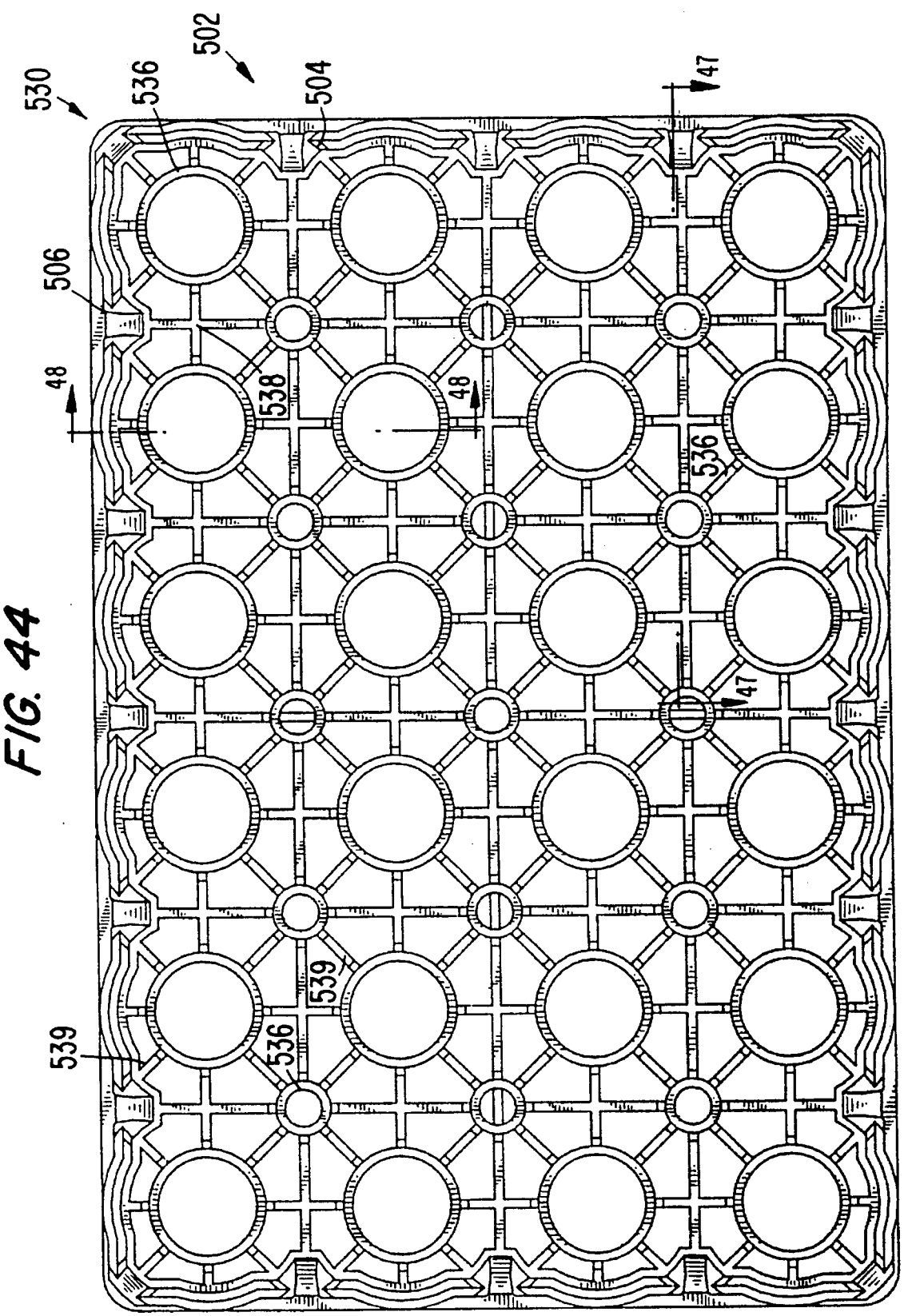
FIG. 44 is a bottom plan view of a sixth tray of the present invention.

The bottom tray surfaces 411 are recessed in with rounded configurations, such as is shown in FIGS. 37 and 38 by the recess areas 412, to receive up thereinto the caps 414 of the bottles 400 on a lower tray as shown generally at 416. This prevents the upper loaded tray 402 from freely sliding along the top of the bottles in a tray 416 beneath it and makes it less likely that the bottles in the lower tray 416 will tip. When in an empty nested arrangement, the upper tray fits into the lower tray so that the rail lip 418 of the lower tray is at the bottom of the rail or band 420 of the upper tray, as best shown in FIG. 37. As can be appreciated from FIGS. 31 and 39, the areas between adjacent columns 422 or columns 422 and adjacent posts 406 and between the floor 408 and the rail 420 define open spaces 424 for reasons discussed above relative to trays 100, 200 and 300 and allow the bottles 400 therein to be easily seen from the sides. The bottles 400 can thus be identified as to type, easily and readily seen to determine whether the tray is fully loaded, and more fully displayed in a retail setting.

Figure 49:
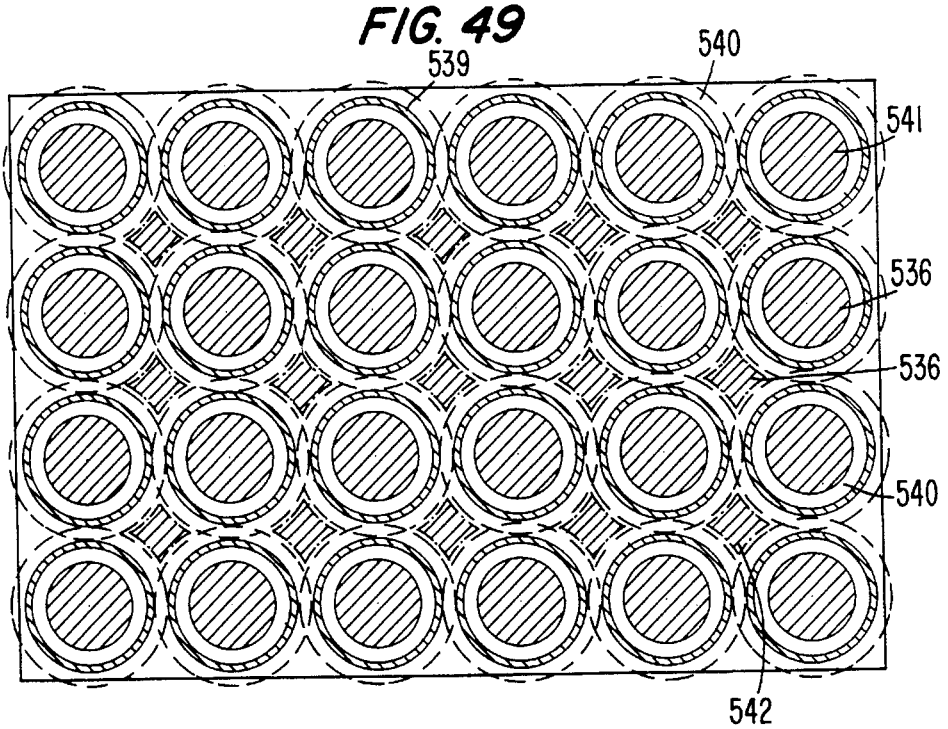
FIG. 49 is a schematic view illustrating the redoubt pattern configuration of the bottom of the fifth tray.
Figure 50:
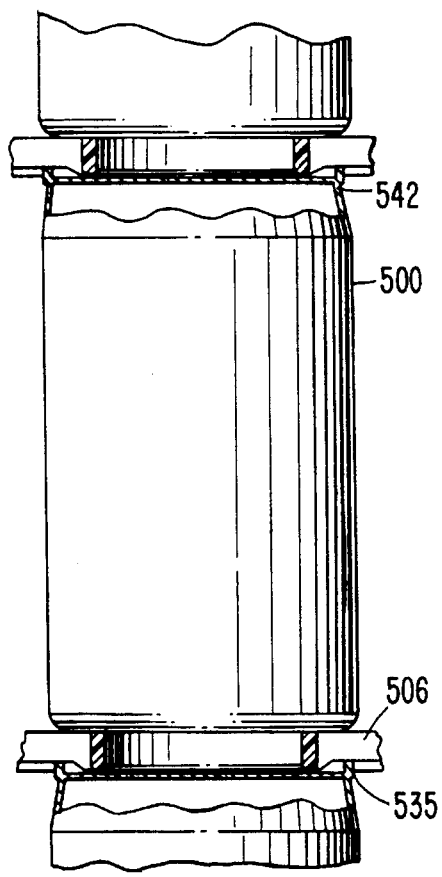
FIG. 50 is a fragmentary view of the fifth tray loaded and stacked and in a locked relationship on a similar loaded lower tray.
Figure 51:
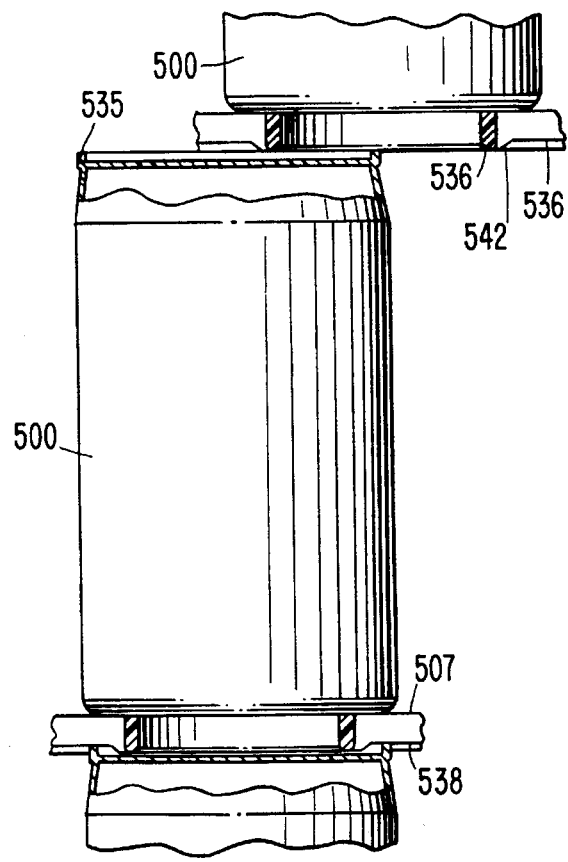
FIG. 51 is a view similar to FIG. 50 but with the loaded and stacked trays in an unlocked relationship.
Figure 52:
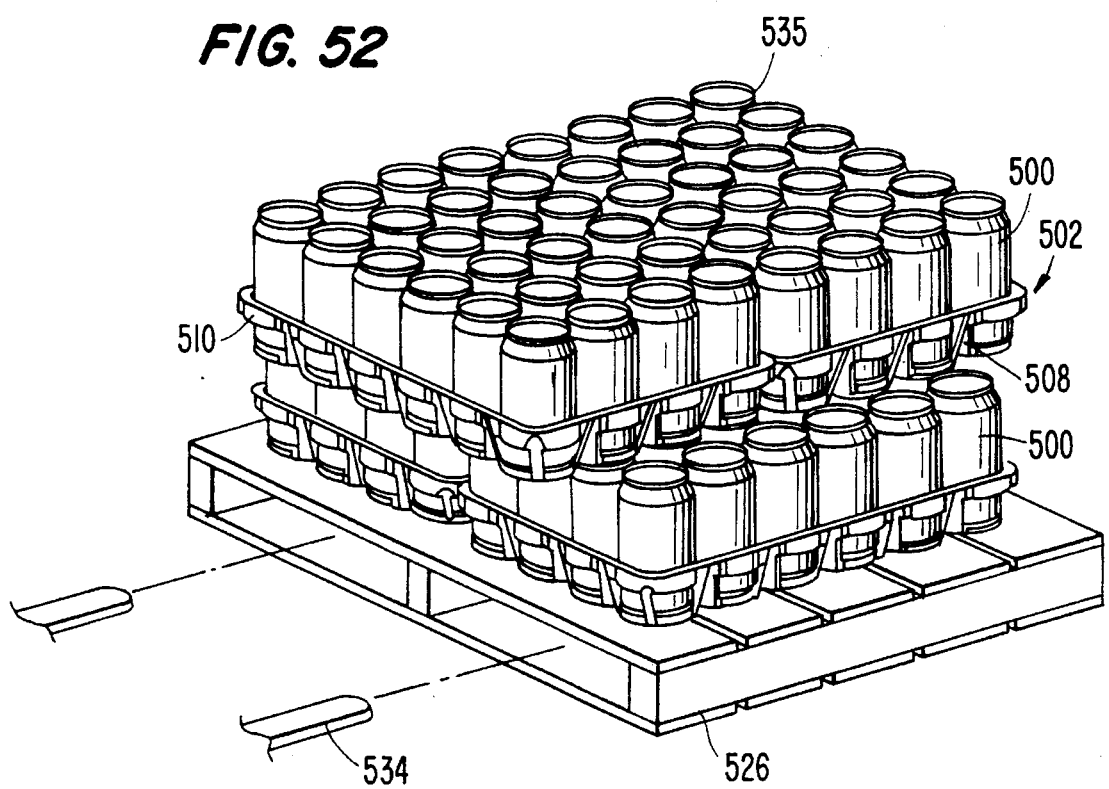
FIG. 52 is a perspective view of the fifth tray loaded and cross-stacked on a pallet.

Another carrier, crate or tray of the present invention, which is particularly configured for handling today's rimmed metal cans such as shown in FIGS. 50–52 at 500 (or at 102 or 206), is illustrated in FIGS. 44–48 generally at 502 and is further explained by reference to FIGS. 49–52. Tray 502 is the same as tray 100 except for the configuration of the bottom surface 504 of the floor 506. The top surface 507 of the floor 506, the columns 508, the rail or top band 510 and the corner support posts 512 correspond to those of tray 100. Further discussion of the construction and advantages of the corresponding elements and the bottom surface 504 follows.

The top band 510 is not only for tray stacking purposes and for holding the top of the tray 502 in a rectangular configuration, but by going in and out and following the shape of the cans 500 for a certain length of the can side wall arc, it also thereby contacts, supports and locates the cans within the tray. The cans 500 when supported on the floor 506 will touch the side wall of the band 510 along the arcuate portions 514 thereof, as shown in FIGS. 47 and 48. That is, there is a surface-to-surface contact laterally supporting the cans 500. The cans 500 then will exert a generally horizontal load against the band 510, and thus this undulating surface or corrugation beneficially makes the wall of the band 510 stronger, more rigid and less likely to be deformed. When molding parts with large numbers of surfaces, it is preferable to not have any of those surfaces comprise long, flat walls since it is difficult to control their shape. Thus, a side wall formed by changing surfaces, as is the present top band 510, tends to be more rigid. Although theoretically there must be some minimum clearance between the cans 500 and the case or tray 502 so that the cans can actually be fitted into the case, once they are in place, they can be touching on all sides and, in fact, will be touching on various sides at any given time.

There is no significant taper to the side walls of the top band 510. Their only taper is a nominal one-quarter degree "taper" merely enough so that the trays 502 can be removed from their molds. These vertical walls allow the trays 502 to support the cans 500 (or bottles) throughout the entire height of the band 510. The support surface (514) follows the shape of the can 500 and is vertical like the shape of the can, and there is thus complete contact between the can and the side wall of the band 510 at a height that is at the highest point of the tray 502. The side wall is thereby effective for its entire height, and the open can label exposing area 516 between the floor 506 and the rail 510 can advantageously be made larger. Since only the small thicknesses of the rail walls are added to the tray length and width dimensions beyond that of the layer of cans, the trays can cross-stack effectively, as illustrated in FIG. 52. Nestable plastic trays with short slanted side walls, which have recently been made available by others, also have the significant slants of their walls added to their effective dimensions, and cross-stacking patterns for them thus do not work well, if at all.

The columns 508, in addition to their nestability function, must also be substantial enough to support the top band 510 so that the carrier or tray 502 does not break apart when the cans 500 push against the top band. The columns 508, by following the shape or contour of the cans, provide substantial structural support. Their pyramid design allows them to have the largest area at their bottom, making it unlikely that they will be torn away from the floor 506 in the event of a severe impact. The present tray 502 thus effectively utilizes the area between the cans 500 to create substantial columns 508, which do not contact and thereby scratch the cans during normal tray handling.

Figure 53:
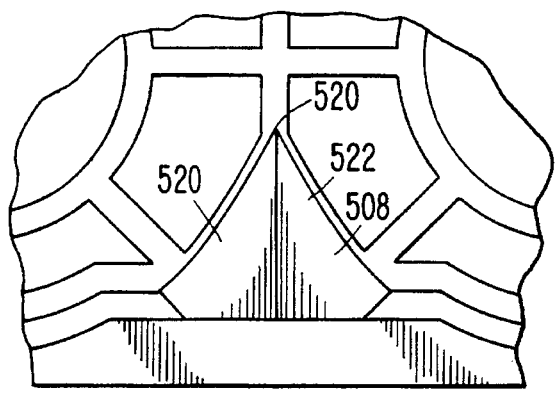
FIG. 53 is a fragmentary top plan view of an alternative column design for any of the trays of the invention.

Alternatively, columns 508 at their maximum size can exactly conform to the shape of the bottom of the can 500 and then taper away at an angle that allows the trays to nest. As shown in FIG. 53, the columns 508 can be two-sided, and their two faces 520, 522 meet at a tangent point 524 in between the cans (500). In other words, the two arcs that form the bottom of the conical areas can be extended through the middle towards the center of the tray (502) where they meet. The cans (500), however, are not dropped into the tray (502) directly from above, but rather are fed in at an angle during normal loading procedures. The cans also sometimes have a secondary wrap, such as a six-pack wrap, on them holding them together, so the columns should not go too far into the tray to interfere with the wrap. The previously disclosed, three-sided column design (see, e.g., 140, 142 and 144) better enables the cans to be fed in at an angle so that they do not strike the columns during loading and also to not interfere with any secondary wrap.

With today's high-speed canning machinery used to palletize or build a pallet load of can trays, it would be difficult to work with the present tray 502, which is fabricated of a material with a low coefficient of friction, if some means were not provided to give the tray an inherent ability to locate itself properly on a lower tray. The stacked and/or cross-stacked trays 502 of cans 500 on a pallet 526 need to be aligned vertically, not for load-bearing reasons, but to build a proper "square" load on the pallet for stability as well as efficient use of space in trucks and warehouses. A redoubt pattern shown generally at 530 is accordingly provided on the floor bottom surface 504. Once palletized, the trays 502 remain in position, safely locked in by the redoubts 532, during in-house movements by fork lifts, as shown in FIG. 52 at 534, or by truck transport. Unlike glass bottles, trays of cans are able to withstand vertical loads from upper trays irrespective of whether or not individual cans are or are not directly above or below one another. This is because the top rim 535 of a can 500, unlike the tops of bottles, approximates the same diameter as the can body and the cans are packed tightly together in the tray.

Delivery route drivers need to be able to easily remove individual trays of cans from a pallet load or a stack of trays, sometimes reaching up overhead to do so, as they make their deliveries. In most cases, lifting a prior art tray of cans up off a lower tray is difficult and can subject the delivery person to a risk of injury. The present tray 502 because of this redoubt pattern 530 only requires that the top loaded tray be twisted about a vertical axis a small amount of between two and eight degrees, or more particularly five degrees, to cause the top tray to contact the rims 535 on can tops below on the non-recessed redoubt member surfaces 536 only, as can be understood by comparing FIGS. 50 and 51. The upper tray can thus slide unimpeded across the lower tray to its new position.

The area in which the redoubts can be positioned is the area that is not occupied by the cross-stacking clearance needed between can rims 535. Thus, the flat recessed area 538 determines where the redoubts 536 can be placed or positioned, and everything that is not flat recessed can be a redoubt. The recessed area 538 can theoretically simply take the shape of the rim 535 and occupy the same area as the rim. However, since the cans (500) do not line up directly under each other and move around during handling, they are not equally spaced. The side walls (510) of the trays also add up in a cross-stacked configuration to cause the cans to shift a slight distance relative to cans above them. Thus, a certain tolerance or clearance between the redoubts 536 is required. A preferred design approach, as depicted in FIG. 49, models the recessed area pattern on the computer from an exact rim pattern 539 as shown by the right hatch marks, adds an extra sixteenth or eighth of an inch clearance width 540, as shown by the dotted lines, to that recessed area and then forms the redoubts 536, as shown by the left hatch marks, in circular and diamond shapes around them. The redoubts 536 depend down between 0.025 and 0.100 inch or approximately 0.050 inch from or relative to the recessed areas 538 (or 539 plus 540).

This design approach thereby positions some 541 of the redoubts inside the rims 535 and some 542 outside the rims or interstitially between a square of cans. Pull-top aluminum cans 500 have open top rims 535 and not just top surfaces as do bottle closures. This allows the redoubt members 536 to also be located within the rims 535 where the members can have a round or disc shape, interstitially between the cans, or both. The redoubt pattern of the '039 application positions the redoubts only between the can rims. However, it has been found that the cans move around more than originally expected, thus requiring larger recessed areas 538. Larger recessed areas 538 necessarily decrease the size of the redoubts 536. With the number of redoubts 536 remaining constant and their sizes decreased, the amount of total redoubt surface area per tray 502 shrinks. Additionally, the bottoms 504 of the trays 502 are subjected to considerable wear, as when the loaded trays are slid along a concrete floor or when they are running on conveyors, and the reduced redoubt surface area was found to wear out too quickly. The present redoubt pattern 530 with additional redoubts 541 inside of the rims 535 significantly and advantageously increases the total redoubt surface wear area, thereby extending the useful life of the tray 502. The locking and unlocking functions of the rim 535 inside and outside redoubt members 535 are the same. If there were no wear problem, then only the inside or the outside redoubt members 541 or 542, and not both, would be needed.

The bevel along the perimeter edges 542 of the redoubt member 535 is the same whether it is on the inside or the outside of the rim 536, and has an angle of between twenty and thirty degrees. Its purpose is to ride the rim 535 off, to have some locking ability yet to be able, with a slight twist of the tray 502, to ride all of the cans off and allow the tray to slide. Thus, with the trays loaded and stacked, the top tray needs to be twisted only approximately five degrees, to shift it so that all the can rims 535 are on the bottom surfaces of the redoubt members 536 and therefore are not locked in. The redoubts 536 enable an upper tray to slide easily over a lower tray once the "lock" between them is broken by this twisting step, as can be understood from FIG. 51.

When the trays are cross-stacked or otherwise oriented in different directions, the two wall thickness shifts add up towards the center of the pallet. The shift pushes the cans out in different directions so that they do not line up precisely one on top of the other. As previously stated, the length and width of the present tray is very close to the length and width of the layer of twenty-four cans since the shift resulting from the thin vertical walls is quite small. With a tapered side wall, the shift is equal to the thickness of the wall plus its taper. Since the shift of the slanted wall trays is larger than that of the present tray, the ability to position redoubts on a slanted wall tray is limited, as larger recessed areas needed. As the recessed areas increase in size the redoubt area must necessarily decrease. At a certain point the redoubts become ineffective as they are too small and thereby wear off early in the life of the tray. This is not a problem, however, with the present vertical wall tray design.

The columns of any of the trays 100, 200, 300, 402, 404 or 502 can be understood or described in either of two ways. One way is that they extend only from the bottom surface of the floor, up to the lower edge of the rail or band, as can be best appreciated from an outside side view especially when in an empty nested arrangement. Thus, the band extends continuously the entire circumference of the tray and includes the upper extensions of the slots of the columns. Another way is that the columns themselves extend all the way to the top of the rails or to the lip, which is better appreciated when looking at the inside of the trays such as shown in the empty perspective views. In the latter case, the band can be considered to comprise a plurality of band segments extending between adjacent columns. Either way an improved sturdy compact tray which is inexpensive to manufacture and handle is defined. This tray when empty is easily and deeply nestable one within the other without any undue manipulation or orientation thereof. The tray has an attractive and open design allowing the containers therein to be fully displayed. The tray has minimum width and length dimensions allowing for effective cross-stacking configurations.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A low depth tray for cylindrical containers adapted to be nested with other trays when empty of the containers and stacked with other trays when loaded with the containers, said tray comprising:

a low depth side wall structure comprising a band extending around the periphery of said tray for preventing the cylindrical containers from tipping during transport;

a floor structure connected to said wall structure, said floor structure comprising a substantially flat, open floor top surface having a plurality of support areas for supporting the containers thereon, and a floor bottom surface having a plurality of spaced downward projections adapted to prevent free sliding of said tray when loaded with the containers and stacked with other trays, the containers each having a top surface defining top rims of the containers, wherein said projections are positioned to be within the top rims of containers in an adjacent tray beneath said tray when loaded with containers and stacked, and also positioned to surround the top rims of containers in an adjacent tray beneath said tray when loaded with containers and stacked, thereby providing rotatably releasable engagement of the bottom of an adjacent tray with the top rims of containers loaded in said tray therebeneath; and a plurality of columns interconnecting said band and said floor structure, said columns configured to nest deeply with columns of another empty tray.

2. The low depth tray of claim 1, wherein said spaced downward projections on said floor bottom surface are adapted to block said tray from free sliding when in a loaded and stacked position, and wherein outer edges of each said projections are beveled surfaces such that a slight rotation of said tray about a generally vertical axis causes said projections to disengage from the top rims of the containers therebeneath and ride up said beveled surfaces into a position allowing free sliding of said tray on the top rims of the containers.

3. The low depth tray of claim 1, wherein said projections comprise inner circular projections generally centered below said support areas positioned to be within the top rim of the container in another tray therebeneath and outer circular projections positioned to encircle the top rim of the container in another tray therebeneath.

4. The low depth tray of claim 3, wherein said inner circular projections are discs.

5. The low depth tray of claim 3, wherein said inner circular projections are rings.

6. The low depth tray of claim 3, further comprising a plurality of spaced island redoubt members projecting downwardly from said floor bottom surface between said outer circular projections.

7. The low depth tray of claim 1, wherein said projections comprise a plurality of spaced island redoubt members adapted to be positioned between the containers in another tray therebeneath in order to block said tray from free sliding when in a loaded and stacked position.

8. The low depth tray of claim 1, wherein said spaced downward projections on said floor bottom surface are generally centered below each of said support areas on said floor top surface.

* * * * *